(12) United States Patent
Tejada et al.

(10) Patent No.: US 8,408,237 B2
(45) Date of Patent: Apr. 2, 2013

(54) MODULAR SPOOL VALVE

(75) Inventors: Emma Cecilia Tejada, East Brunswick, NJ (US); Laurence Vaughan Borst, Vaughan, NJ (US); Gregory James Volz, Pequannock, NJ (US)

(73) Assignee: Automatic Switch Company, Florham Park, NJ (US)

( * ) Notice: Subject to any disclaimer, the term of this patent is extended or adjusted under 35 U.S.C. 154(b) by 858 days.

(21) Appl. No.: 12/554,225

(22) Filed: Sep. 4, 2009

(65) Prior Publication Data

US 2011/0057140 A1   Mar. 10, 2011

(51) Int. Cl.
*F16K 27/00* (2006.01)
(52) U.S. Cl. .......................... 137/269; 251/366
(58) Field of Classification Search .......... 137/269–271, 137/884; 251/366, 367
See application file for complete search history.

(56) References Cited

U.S. PATENT DOCUMENTS

| | | |
|---|---|---|
| 3,202,170 A | 8/1965 | Holbrook |
| 3,516,442 A | 6/1970 | Munroe |
| 3,625,254 A | 12/1971 | Rice |
| 3,719,199 A | 3/1973 | Mentink |
| 3,722,531 A * | 3/1973 | Verhart ........................ 137/271 |
| 3,915,194 A * | 10/1975 | Friedrich ..................... 137/884 |
| 3,951,170 A | 4/1976 | Hill |
| 3,960,166 A | 6/1976 | Linser |
| 3,976,103 A | 8/1976 | Ostic |
| 3,989,058 A | 11/1976 | Jackson et al. |
| 4,059,878 A | 11/1977 | Jackson et al. |
| 4,133,348 A | 1/1979 | Spitz |
| 4,256,313 A | 3/1981 | Arnold |
| 4,524,807 A * | 6/1985 | Toliusis ........................ 137/884 |
| 4,561,629 A | 12/1985 | Idogaki et al. |
| 4,817,666 A | 4/1989 | Sanville |
| 4,979,530 A | 12/1990 | Breda |
| 5,086,803 A * | 2/1992 | Nakajima ..................... 137/270 |
| 5,111,840 A | 5/1992 | Miller et al. |
| 5,167,254 A * | 12/1992 | Walter et al. .................. 137/595 |
| 5,487,527 A | 1/1996 | Eggleston |

(Continued)

FOREIGN PATENT DOCUMENTS

DE     202006015673     2/2007

OTHER PUBLICATIONS

Rusanu, I., International Search Report for International Patent Application No. PCT/US2010/047771, dated Feb. 15, 2011, European Patent Office.

(Continued)

*Primary Examiner* — Kevin Lee
(74) *Attorney, Agent, or Firm* — Locke Lord LLP

(57) ABSTRACT

A control valve comprising a plurality of interchangeable valve body modules, each module having a main valve cavity and a plurality of separate cross valve communication ports communicating; and at least one interchangeable gasket disposed between adjacent modules and configured to individually communicate the main valve cavity and the communication ports between adjacent valve body modules, wherein the gasket is further configured to selectively communicate between the main valve cavity and a selected one of the cross valve communication ports. In one embodiment, each valve body module further includes a passage communicating with the main valve cavity. In this case, the gasket may be configured to selectively communicate between the passage and the selected one of the cross valve communication ports, thereby selectively communicating between the main valve cavity and the selected one of the cross valve communication ports through the passage by selective orientation of the gasket.

17 Claims, 30 Drawing Sheets

U.S. PATENT DOCUMENTS

| | | |
|---|---|---|
| 5,762,315 A | 6/1998 | Eggleston |
| 5,853,022 A | 12/1998 | Eggleston et al. |
| 5,881,767 A | 3/1999 | Loser |
| 5,975,487 A | 11/1999 | Eggleston |
| 5,979,864 A | 11/1999 | Eggleston |
| 5,988,205 A | 11/1999 | Eggleston |
| 6,000,675 A | 12/1999 | Eggleston |
| 6,062,534 A | 5/2000 | Eggleston |
| 6,145,540 A | 11/2000 | Linkner, Jr. |
| 6,901,961 B2 | 6/2005 | Roberts et al. |
| 2003/0111123 A1 | 6/2003 | Rudle |
| 2006/0284131 A1 | 12/2006 | Cripps et al. |
| 2007/0131294 A1 | 6/2007 | Zub |

OTHER PUBLICATIONS

Rusanu, I., Written Opinion for International Patent Application No. PCT/US2010/047771, dated Feb. 15, 2011, European Patent Office.

* cited by examiner

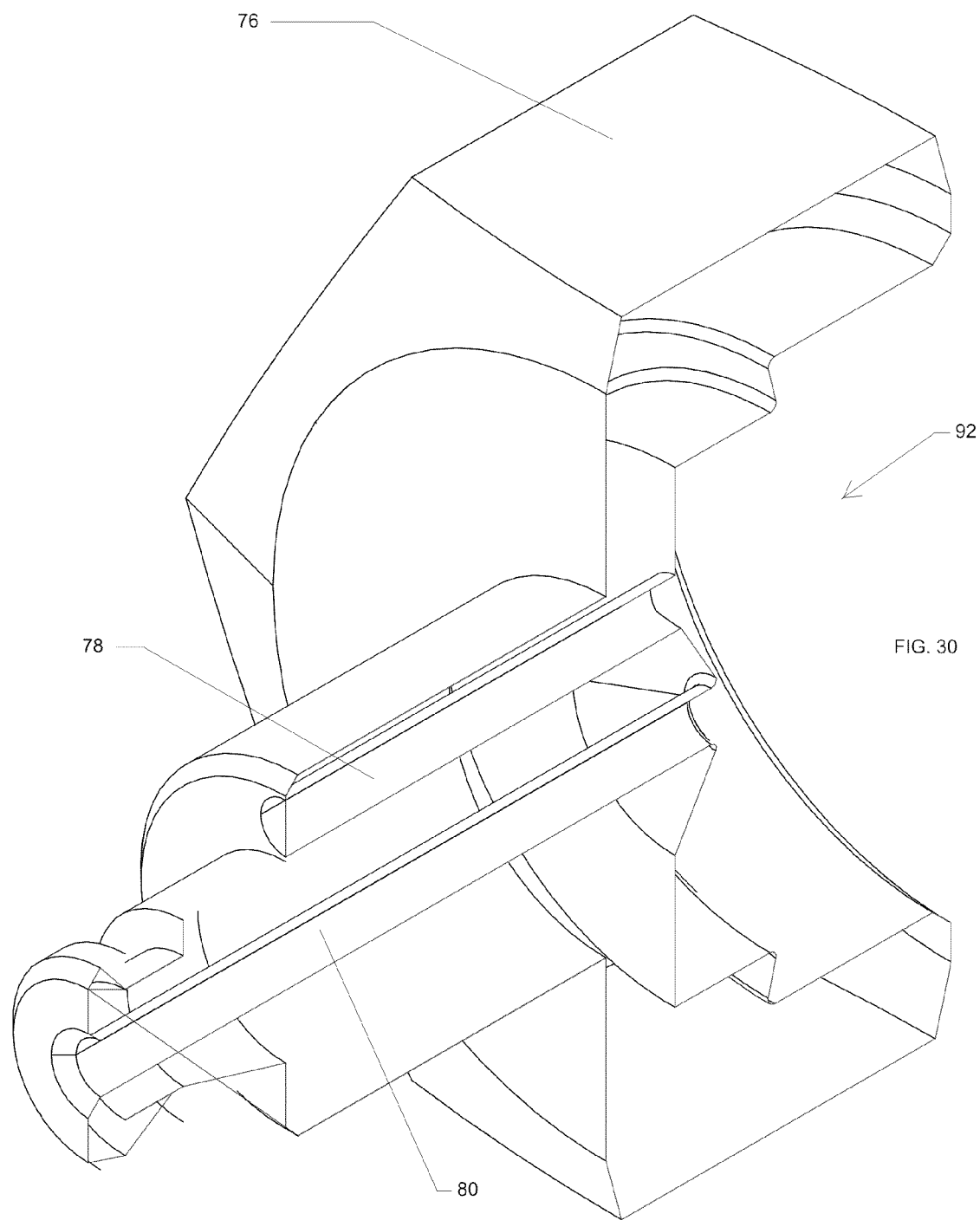

MODULAR SPOOL VALVE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to control valves; and more specifically relate to spool valves.

2. Description of the Related Art

U.S. Pat. No. 3,202,170 discloses "an improved assembly of sectionalized interchangeable parts from which most, if not all, of the needed varieties of control valves can be built-up in miniature form for employment in fluid logic circuitry."

U.S. Pat. No. 3,516,442 discloses a "sectionalized modular valve system having a minimum number of component parts including a series of end and end stacked housing sections with individual valving and control machanisms [sic], including a hollow annulus, mounted between each pair of sections and providing both the sealing means therebetween [sic] and an internal working cylinder for slidably receiving and co-functioning with an internally positioned valve and/or control. Additional features include rectangular cross section valve sealing rings providing a minimum valving stroke; tapered annular members providing for easy attachment and detachment of fluid coupling or plug fittings, and spring clip fasteners engaging and securing adjacent sections into an assembled modular valve unit wherein each individual section is removable without disassembly of the entire valve."

U.S. Pat. No. 3,625,254 discloses a "segmented valve spool in a fluid control valve permitting very accurate control over spacing between various portions of the spool. The segmented spool portions are selectively separated by shims with resilient means such as springs urging the spool segments toward each other. To avoid binding of the segmented spool within a spool bore, each shim assembly includes a tapered member or ball to establish point contact between each pair of adjacent spool segments."

U.S. Pat. No. 3,719,199 discloses a "modular spool valve construction having a plurality of identical body members assembled end to end between cap members and housing a spool element. Each body member is formed with a longitudinal passage having aligned spool seating portions at each end thereof and a central chamber, the latter having a lateral passage between the chamber and an outside wall surface for conduit connection. The end faces of the members are provided with complementary surfaces formed with aligned means concentrically of the spool seating portions for a piloted nesting together of a series of body members and a pocketing between adjacent members of a flexible ring seal. Longitudinal tiebolt corner openings are spaced at 90.degree. for selecting the lateral direction of the connector passage of each chamber in assembling the parts."

U.S. Pat. No. 3,951,170 discloses a "fluid control valve comprising a housing having at least two chambers separated by a wall. An opening is bored through the common wall of the two chambers and a tubular gate means sealably and slidably positioned in the bore so that it can move from one position where it seals off a first chamber to a second position where it uncovers the first chamber and seals off a second chamber. External means are provided for moving the tubular gate means in the bore."

U.S. Pat. No. 3,960,166 discloses a "valve assembly kit permits the assembling of a plurality of different slide valves each having an elongated housing element formed with a main passage, fluid passages communicating with the main passage, and fluid ports which also communicate with the main passage, and an elongated valve spool element slidably receivable in the main passage. One or both of these elements comprises a plurality of diverse but interchangeable components which can be coaxially assembled in different sequences so as to obtain a selectable configuration of the respective element."

U.S. Pat. No. 3,976,103 discloses a "sliding spool type valve and method of making the same in which a set of like valve plates and a set of like pot plates are interleaved in a stack to form a laminated valve body having a central valve bore with valve ports at spaced locations therealong and a plurality of lengthwise extending flow passages at uniform angularly spaced positions around the valve bore, the port plates each having a transfer passage extending outwardly from the valve bore and the port plates of the set being disposed at relatively different angular positions in the stack to have the transfer passage communicate with different ones of the lengthwise extending flow passages. The port and valve plates have flat side faces and the plates are clamped together in a stack by bolts extending through angularly spaced bolt openings in the port and valve plates. The valve bore is honed after the plates are assembled in a stack to receive a sliding spool type valve member."

U.S. Pat. No. 3,989,058 discloses a "condition responsive valve construction having a first housing provided with an internal chamber and an inwardly directed shoulder projecting into the chamber and defining a first valve seat on one side thereof and a spring seat on the other side thereof. An axially movable valve means is disposed in the chamber for controlling the valve seat. A spring is disposed between the spring seat and the valve member to tend to move the valve member in one axial direction in the chamber. A condition responsive device is carried by the housing and is operatively interconnected to the valve member to move the valve member in the other axial direction upon an increase in the sensed condition. One or more additional housing can be added to the first housing in stacked aligned relation therewith and with each new housing having a valve seat arrangement to be controlled by the valve member."

U.S. Pat. No. 4,059,878 discloses a "condition responsive valve construction having a first housing provided with an internal chamber and an inwardly directed shoulder projecting into the chamber and defining a first valve seat on one side thereof and a spring seat on the other side thereof. An axially movable valve means is disposed in the chamber for controlling the valve seat. A spring is disposed between the spring seat and the valve member to tend to move the valve member in one axial direction in the chamber. A condition responsive device is carried by the housing and is operatively interconnected to the valve member to move the valve member in the other axial direction upon an increase in the sensed condition. One or more additional housing can be added to the first housing in stacked aligned relation therewith and with each new housing having a valve seat arrangement to be controlled by the valve member."

U.S. Pat. No. 4,133,348 discloses a "valve comprising a valve body having a bore, a hollow plunger reciprocable [sic] within said bore and having radial ports to control flow of fluid under pressure between various valve body openings. Seals are disposed about the exterior surface of the plunger to seal against fluid flow longitudinally of the bore. The seals are of a type that offer low resistance to movement of the plunger from a static condition, and the exterior surface of the plunger has an extremely smooth finish and is of a comparatively small outside diameter to further reduce resistance to plunger movement. The valve construction is such that whenever a plunger port passes underneath a seal, fluid pressure is always from the inside of the plunger to the outside so that there is a tendency to temporarily lift the seal from the exterior surface of the plunger or at least to prevent the seal from being forced into the plunger port. The foregoing provides a low friction valve wherein the plunger may be moved from one position to another with a minimum of force so that a relatively small solenoid may be used to provide the moving force for the plunger."

U.S. Pat. No. 4,256,313 discloses a "universal mechanical seal gland formed of plastic has a central aperture positionable over a shaft extending from a housing for positioning a stationary seal against a rotary seal on the shaft. The central aperture is formed of a plurality of cylindrical and radial surfaces which define sealing surfaces permitting the gland to be used with a variety of differently sized and shaped seal members and housings and differently sized shafts."

U.S. Pat. No. 4,561,629 discloses a "solenoid valve for opening and closing a fluid passage is disclosed. It includes a valve member supported rotatably within a case and having alternately different magnetic poles formed on the outer periphery of one end thereof and also having a fluid passage formed in the other end thereof; an electromagnetic drive means for creating alternately different and invertible magnetic poles in an opposed relation to the magnetic poles of the valve member to rotate the valve member by a predetermined angle; and plural fluid passages formed within the case and adapted to be brought into communication with each other through the fluid passage of the valve member upon rotation of the valve member at said predetermined angle."

U.S. Pat. No. 4,817,666 discloses a "fluid flow control valve in a fluid flow control circuit comprises a cavity, first, second and third ports open to the cavity, and a valve member for selectively closing the first port or the second port. The third port serves as an input for receiving fluid under pressure and the other two ports serve as to outputs for this fluid each extending to an associated outlet. A solenoid causes an armature to rotate about a lining so that a lever on the armature is arranged for selectively opening and closing the outlets to close the output associated with this outlet. The valve member is responsive to pressure drop at one or other of the outlets to close the output associated with this outlet. Downstream of the valve there are ducts extend [sic] from between the input and each of the outlets for supplying fluid received from the input."

U.S. Pat. No. 4,979,530 discloses a "valve housing is claimed which provides for diversion of fluid flow into a valve cartridge from a selected inlet through a selected outlet to the valve cartridge. An opening is provided in the housing in which the cartridge is located. The housing also has diverting mechanisms disposed between the cartridge and the fluid inlets. The diverting mechanisms may be adjusted to orient the fluid flow into the valve cartridge. For example, if an installer incorrectly installs the hot and cold water inlets to the housing, the diverting mechanism may be moved to provide the correct orientation of flow into the valve cartridge."

U.S. Pat. No. 5,111,840 discloses a "modular valve has a valve housing which defines a manifold interface having a normally open port, a normally closed port and a common port. A manifold block is mounted to the valve housing with its valve interface sealed against the manifold interface. The valve interface of the manifold block has first, second and third valve ports which lead to respective first, second and third mounting ports at a mounting interface of the manifold block. The first, second and third valve ports and the normally open normally closed and common ports are arranged to communicate with one another in either of two angularly spaced positions of the valve housing relative to the manifold block. In one position, the first valve port communicates [sic] with the normally open port, the second valve port communicates with the normally closed port, and the third valve port communicates with the common port. In the other position, the first valve port communicates with the normally closed port, the second valve port communicates with the normally open port, and the third valve port communicates with the common port."

U.S. Pat. No. 5,487,527 discloses an "actuator for fluid control valves with a reversible power module having a stationary inner member and a coaxially aligned movable outer member coupled to the valve flow control element and slidably movable on the inner member. A chamber is formed between respective ends of the members. Pneumatic pressure applied to the chamber drives the movable member to actuate the valve in a first direction. A spring returns the movable member in the second direction. A second chamber is defined within the inner member and pneumatic pressure applied to the second chamber drives the movable member with or without the spring."

U.S. Pat. No. 5,762,315 discloses an "actuator for fluid control valves with a reversible power module having a stationary inner member and a coaxially aligned movable outer member coupled to the valve flow control element and slidably movable on the inner member. A chamber formed between respective ends of the members includes a preformed bladder. Pneumatic pressure applied to the bladder drives the movable member to actuate the valve in a first direction. A spring returns the movable member in the second direction. The preformed bladder is formed with two pieces including an interconnecting perimeter portion. During bladder actuation the bladder perimeter portion is displaced from the bladder inner diameter to the bladder outer diameter with the bladder material in tension to thereby prolong bladder life."

U.S. Pat. No. 5,853,022 discloses a "valve actuator with an instrument mounting pad and a manifold in a power module and yoke combination for mounting a valve controller instrument without tubing or mounting brackets. A cover encloses the feedback linkage between the actuator and instrument. The actuator includes a second instrument mounting pad and manifold so the power module is reversible to accommodate fail-safe opened or fail-safe closed valve conditions. A valve actuator and instrument combination is no higher than the actuator alone."

U.S. Pat. No. 5,881,767 discloses a "piezo valve arrangement for gas mixers or respirators, which is built up modularly from individual valve elements. At least one individual valve element, which is provided in its housing with a pressurized gas channel and a gas discharge channel, is arranged between a connection plate with a pressurized gas connection and a gas discharge connection, on the one hand, and a closing plate, on the other hand, wherein the direction of the gas flow in each valve element is from the pressurized gas channel via a metering screw, a metering channel, and a piezo vibrating element held freely vibrating on one side with a seal to the gas discharge channel."

U.S. Pat. No. 5,975,487 discloses a "rotary valve actuator for fluid control valves having improved actuator linkage matching the torque requirements of most rotary shaft valves. A link member is pivotally interconnected to a linear movable actuating member and to a rotatable lever. The link member enables a high actuator torque to be developed and provided during the times when the valve requires a high torque, and a low actuator torque during other times when the valve only requires a lower torque. A high-low-high actuator torque is provided matching the high-low-high torque requirements of most rotary valves."

U.S. Pat. No. 5,979,864 discloses a "rotary valve actuator with movable actuator linkage maintained in a constant "pull-pull" tension, includes a sliding canister, rotatable lever, and a return spring substantially aligned in-line with each other. The linear motion of the canister in response to an expanding and contracting pressurized bladder is converted through chain linkage into rotary lever motion. The return spring is connected through respective chain linkage to the lever so the pulling tension of the spring/lever linkage rotates the lever and maintains tension on both chain linkages. Adjustable travel stops are provided. In an alternate embodiment the return spring chain linkage is configured at right angles to the linear movement of the canister. A double acting rotary valve actuator with pressurized bladders on opposite sides of a rotatable lever. One bladder is oval shaped. The other bladder is oval shaped with double convolutions enabling the associated canister to be driven with a center rod through the middle of the double convolutions bladder. A linear valve actuator with a double convolutions bladder driving a canister center rod through the bladder center, and with a return spring for actuating a valve stem."

U.S. Pat. No. 5,988,205 discloses a "rotary valve actuator with movable actuator linkage maintained in a constant "pull-pull" tension, includes a sliding canister, rotatable lever, and a return spring substantially aligned in-line with each other. The linear motion of the canister in response to an expanding and contracting pressurized bladder is converted through chain linkage into rotary lever motion. The return spring is connected through respective chain linkage to the lever so the pulling tension of the spring/lever linkage rotates the lever and maintains tension on both chain linkages. Adjustable travel stops are provided. In an alternate embodiment the return spring chain linkage is configured at right angles to the linear movement of the canister. A zero lost motion universal connection includes a splined sleeve matching the splined valve shaft and inserted into a lever bore. A set screw with a flat front end is threaded into the lever and tightened against a flat surface on the splined sleeve exterior."

U.S. Pat. No. 6,000,675 discloses a "rotary valve actuator with movable actuator linkage maintained in a constant "pull-pull" tension, includes a sliding canister, rotatable lever, and a return spring substantially aligned in-line with each other. The linear motion of the canister in response to an expanding and contracting pressurized bladder is converted through chain linkage into rotary lever motion. The return spring is connected through respective chain linkage to the lever so the pulling tension of the spring/lever linkage rotates the lever and maintains tension on both chain linkages. Adjustable travel stops are provided. In an alternate embodiment the return spring chain linkage is configured at right angles to the linear movement of the canister."

U.S. Pat. No. 6,062,534 discloses a "rotary valve actuator with movable actuator linkage maintained in a constant "pull-pull" tension, includes a sliding canister, rotatable lever, and a return spring substantially aligned in-line with each other. The linear motion of the canister in response to an expanding and contracting pressurized bladder is converted through chain linkage into rotary lever motion. The return spring is connected through respective chain linkage to the lever so the pulling tension of the spring/lever linkage rotates the lever and maintains tension on both chain linkages. Adjustable travel stops are provided. In an alternate embodiment the return spring chain linkage is configured at right angles to the linear movement of the canister. A double acting rotary valve actuator with pressurized bladders on opposite sides of a rotatable lever. One bladder is oval shaped. The other bladder is oval shaped with double convolutions enabling the associated canister to be driven with a center rod through the middle of the double convolutions bladder."

U.S. Pat. No. 6,145,540 discloses a "rotary solenoid valve for controlling pressurized fluid in a vehicular hydraulic system includes a housing having a bore. A valve body is mounted in the bore. The valve body includes an axial bore in fluid communication with a supply port, an output port, and a reservoir port. Each of the ports in the valve body is also in fluid communication with a corresponding fluid passage formed in the housing. A rotor is received in the axial bore of the valve body. The rotor includes at least one flat having a predetermined length so that the flat is in fluid communication with the ports in the valve body. An upper stator is mounted on the valve body about the rotor. A coil is mounted about the upper stator for generating a magnetic field to selectively rotate the rotor. Rotation of the rotor directs fluid through the valve between various ports as desired."

U.S. Pat. No. 6,901,961 discloses a "double diaphragm pump having a spool valve. The spool valve includes a housing that has a first end, a second end, and at least one housing aperture defined therethrough from the first end to the second end of the housing. The spool valve also includes end plates positioned at the first and second ends of the housing. The end plates include at least one plate aperture defined therein that is aligned with the housing aperture. The spool valve further includes at least one stiffening and retaining rod inserted through the plate apertures and the housing."

U.S. Patent Application No. 20060284131 discloses a "hub (12) for coupling a valve (10) having lead wires (14) to a conduit (16) carrying electrical lines to allow a watertight connection of the lead wires (14) to the electrical lines. The solenoid assembly (40) comprises a casing (66) including a boss (72) through which the lead wires (14) extend. The hub (12) comprises a conduit-coupling portion (84) and a boss-attaching portion (86). The boss-attaching portion (86) includes a rim (98) which is crimped to the outer surface of the boss (72) to attach the hub (12) to the solenoid assembly (40). The hub (12) is able to rotate relative to the boss (72) whereby it may be coupled to the conduit (16) without rotation of the solenoid assembly (40) and/or the conduit (16)."

The inventions disclosed and taught herein are directed to [an improved design for modular spool valves.

BRIEF SUMMARY OF THE INVENTION

A control valve comprising a plurality of interchangeable valve body modules, each module having two mating surfaces, an exterior surface between the mating surfaces, a main valve cavity communicating between the mating surfaces, a main port communicating between the exterior surface and the main valve cavity, and a plurality of separate cross valve communication ports communicating between the mating surfaces; and at least one interchangeable gasket disposed between adjacent mating surfaces and configured to individually communicate the main valve cavity and the cross valve communication ports between adjacent valve body modules, wherein the gasket is further configured to selectively communicate between the main valve cavity and a selected one of the cross valve communication ports. In one embodiment, the valve comprises three valve body modules, at least two gaskets, a valve spool extending along the main valve cavities of the valve body modules and gaskets, and two endcaps. In another embodiment, a first one of the valve body modules is oriented in a first direction with its main port forming an input port of the valve, a second one of the valve body modules is oriented in a second direction with its main port forming a common port of the valve, and a third one of the valve body modules is oriented in the first direction with its main port forming an exhaust port of the valve. In some embodiments, one of the main ports of one of the valve body modules forms an input port of the valve which is communicated through each of the valve body modules by the cross valve communication ports. In some embodiments, one of the main ports of one of the valve body modules forms an output port of the valve which is communicated through each of the valve body modules by the cross valve communication ports. In some embodiments, one of the main ports of one of the valve body modules forms a common port of the valve which is communicated through each of the valve body modules by the cross valve communication ports. The gasket may be configured to selectively isolate the main valve cavity and the cross valve communication ports. In some embodiments, the valve body modules are identical.

In one embodiment, each valve body module further includes a passage communicating between the main valve cavity and one of the two mating surfaces. In this case, the gasket may be configured to individually communicate each cross valve communication port between adjacent valve body modules and selectively communicate between the passage and the selected one of the cross valve communication ports, thereby selectively communicating between the main valve cavity and the selected one of the cross valve communication ports through the passage by selective orientation of the gasket. More specifically, the gasket may be configured to selectively communicate between the main valve cavity and the selected one of the cross valve communication ports by selective orientation of the gasket. For example, the gasket may be configured to communicate between the main valve cavity and a first one of the cross valve communication ports in a first orientation, communicate between the main valve cavity and a second one of the cross valve communication ports in a second orientation, and/or isolate the main valve cavity from the cross valve communication ports in a third and/or fourth orientation.

BRIEF DESCRIPTION OF THE SEVERAL VIEWS OF THE DRAWINGS

FIG. 30 illustrates a sectional view of another particular embodiment of a lug utilizing certain aspects of the present inventions.

DETAILED DESCRIPTION

Figure 1:
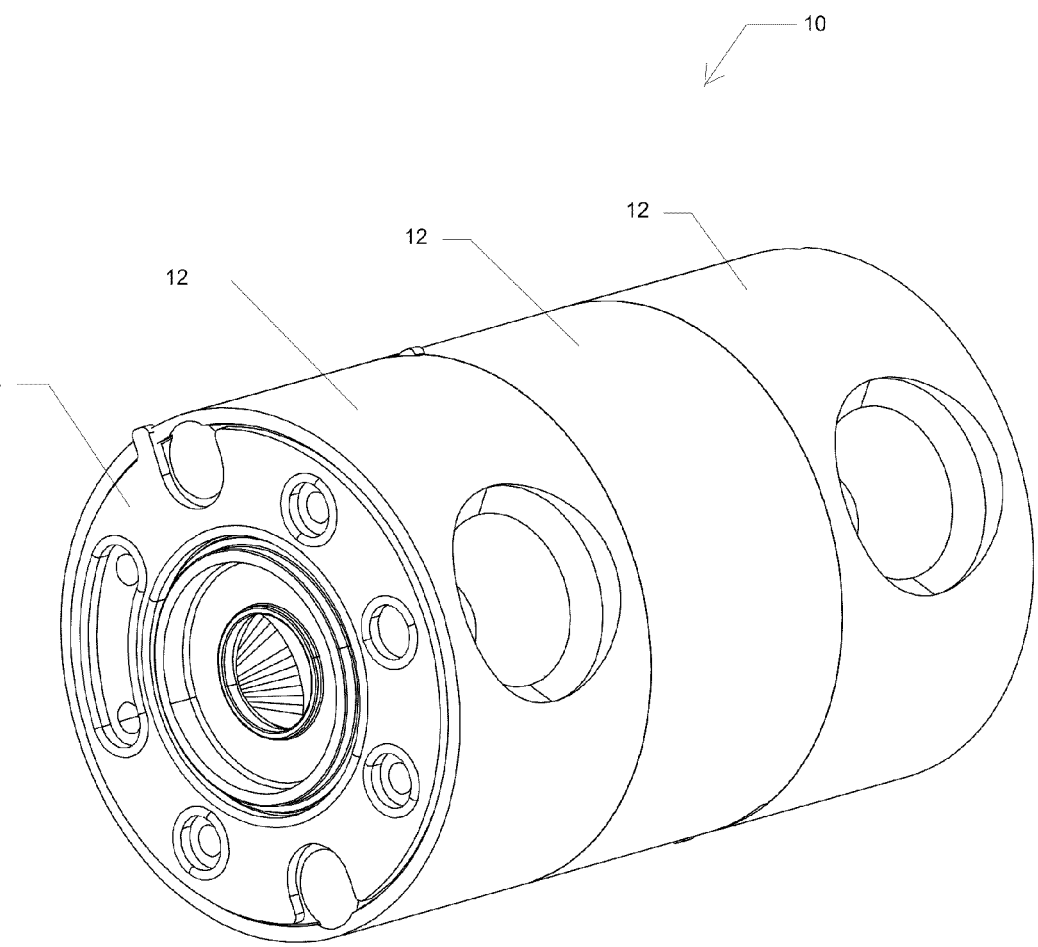
FIG. 1 illustrates a perspective view of a particular embodiment of select components of a modular spool valve utilizing certain aspects of the present inventions.
Figure 2:
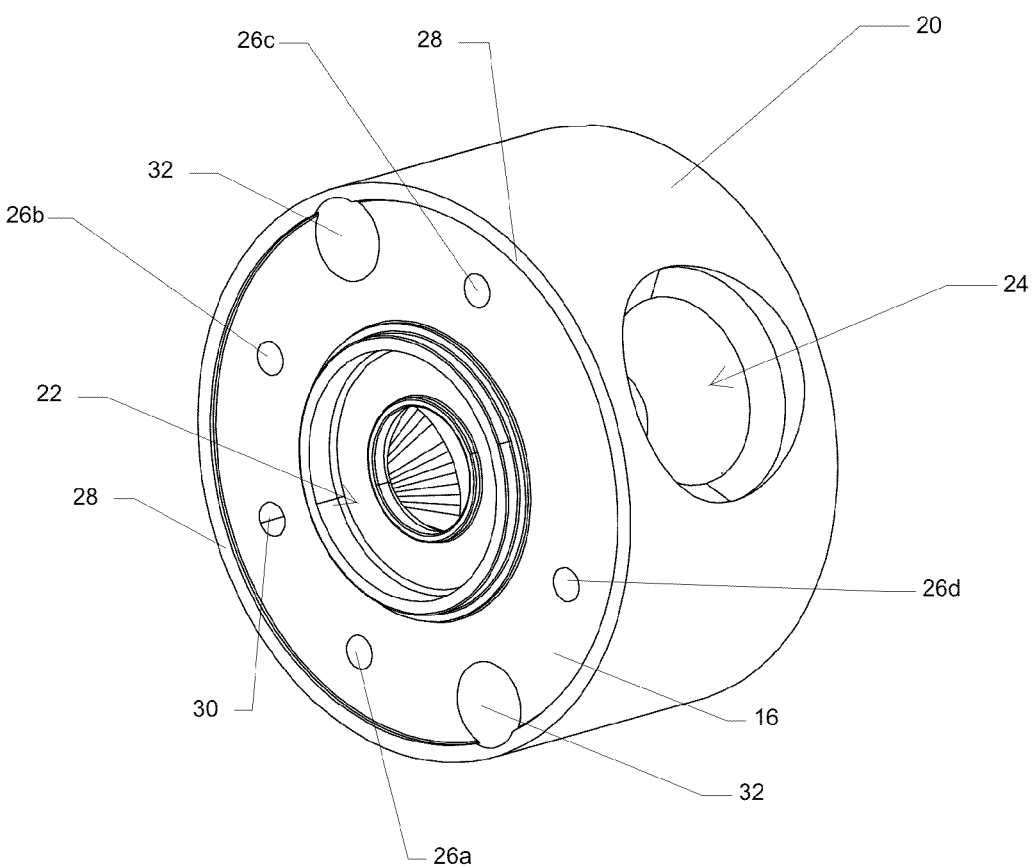
FIG. 2 illustrates a perspective view of a particular embodiment of a valve body module utilizing certain aspects of the present inventions.
Figure 3:
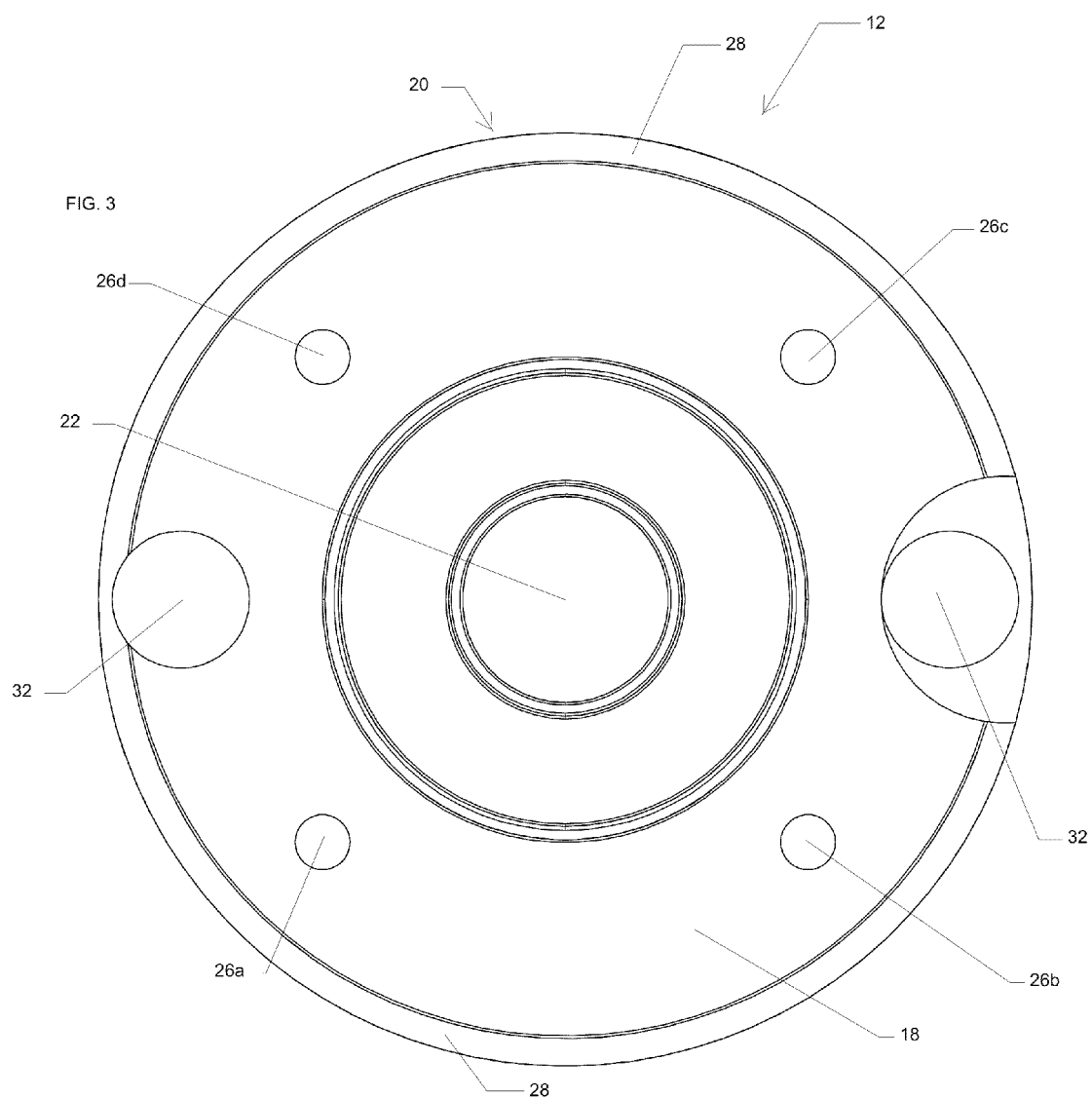
FIG. 3 illustrates a first elevation view of a particular embodiment of the valve body module utilizing certain aspects of the present inventions.
Figure 4:
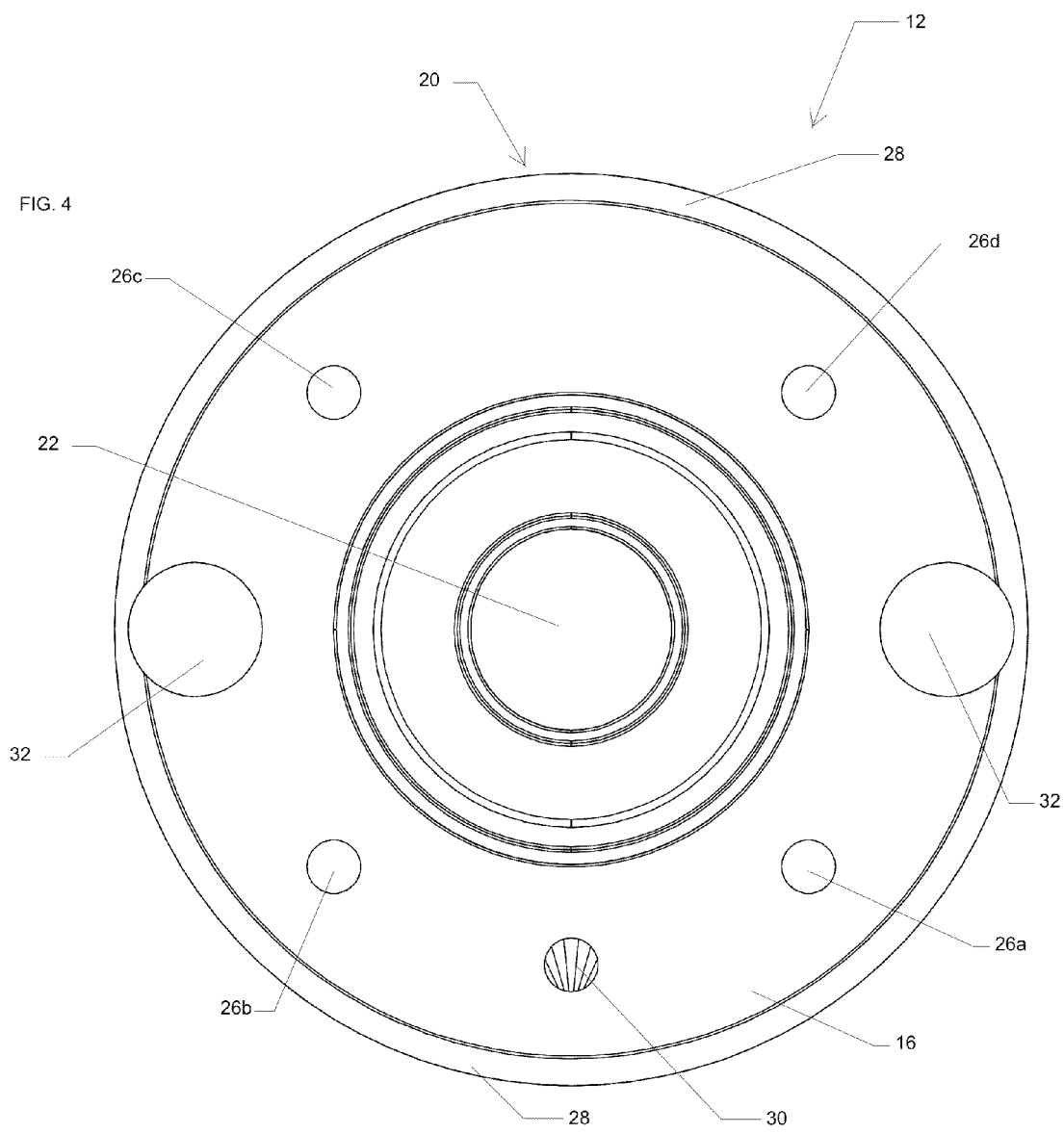
FIG. 4 illustrates a second elevation view of a particular embodiment of the valve body module utilizing certain aspects of the present inventions.
Figure 5:
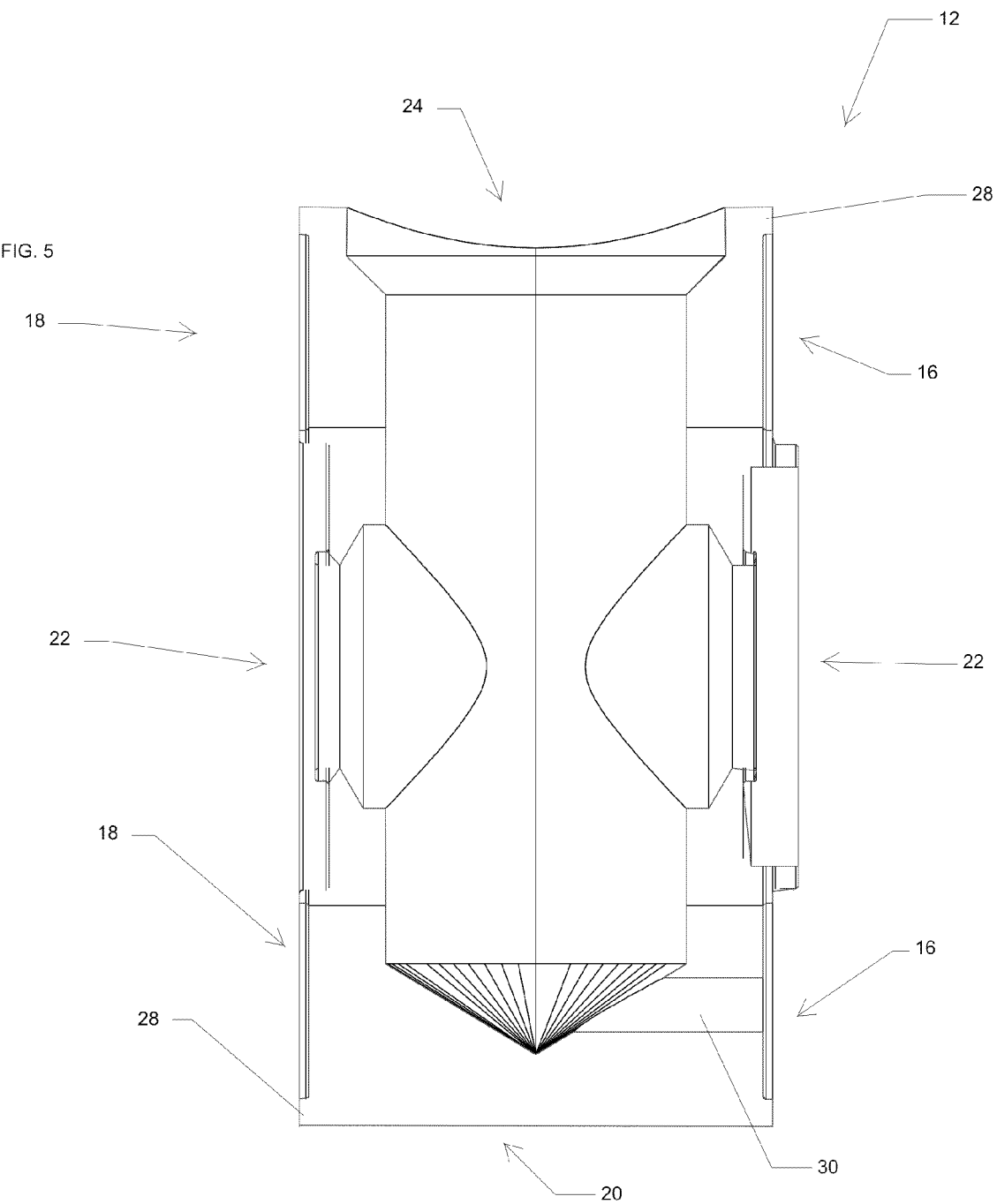
FIG. 5 illustrates a sectional view of a particular embodiment of the valve body module utilizing certain aspects of the present inventions

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created a control valve comprising a plurality of interchangeable valve body modules, each module having two mating surfaces, an exterior surface between the mating surfaces, a main valve cavity communicating between the mating surfaces, a main port communicating between the exterior surface and the main valve cavity, and a plurality of separate cross valve communication ports communicating between the mating surfaces; and at least one interchangeable gasket disposed between adjacent mating surfaces and configured to individually communicate the main valve cavity and the cross valve communication ports between adjacent valve body modules, wherein the gasket is further configured to selectively communicate between the main valve cavity and a selected one of the cross valve communication ports. In one embodiment, the valve comprises three valve body modules, at least two gaskets, a valve spool extending along the main valve cavities of the valve body modules and gaskets, and two endcaps. In another embodiment, a first one of the valve body modules is oriented in a first direction with its main port forming an input port of the valve, a second one of the valve body modules is oriented in a second direction with its main port forming a common port of the valve, and a third one of the valve body modules is oriented in the first direction with its main port forming an exhaust port of the valve. In some embodiments, one of the main ports of one of the valve body modules forms an input port of the valve which is communicated through each of the valve body modules by the cross valve communication ports. In some embodiments, one of the main ports of one of the valve body modules forms an output port of the valve which is communicated through each of the valve body modules by the cross valve communication ports. In some embodiments, one of the main ports of one of the valve body modules forms a common port of the valve which is communicated through each of the valve body modules by the cross valve communication ports. The gasket may be configured to selectively isolate the main valve cavity and the cross valve communication ports. In some embodiments, the valve body modules are identical.

In one embodiment, each valve body module further includes a passage communicating between the main valve cavity and one of the two mating surfaces. In this case, the gasket may be configured to individually communicate each cross valve communication port between adjacent valve body modules and selectively communicate between the passage and the selected one of the cross valve communication ports, thereby selectively communicating between the main valve cavity and the selected one of the cross valve communication ports through the passage by selective orientation of the gasket. More specifically, the gasket may be configured to selectively communicate between the main valve cavity and the selected one of the cross valve communication ports by selective orientation of the gasket. For example, the gasket may be configured to communicate between the main valve cavity and a first one of the cross valve communication ports in a first orientation, communicate between the main valve cavity and a second one of the cross valve communication ports in a second orientation, and/or isolate the main valve cavity from the cross valve communication ports in a third and/or fourth orientation.

FIG. 1 is an illustration of select components of a modular spool valve 10, such as the type commonly used in process control systems, or applications. More specifically, the spool valve 10 of the present invention comprises one or more valve body modules 12 and one or more gaskets 14. In many embodiments, the valve 10 likely also includes other components, such as seals, spools, solenoids, manual operators, etc., such as those found in U.S. Pat. Nos. 3,202,170, 3,516,442, 3,625,254, 3,719,199, 3,951,170, 3,960,166, 3,976,103, 3,989,058, 4,059,878, 4,133,348, 4,256,313, 4,979,530, 5,111,840, 5,487,527, 5,762,315, 5,853,022, 5,881,767, 5,975,487, 5,979,864, 5,988,205, 6,000,675, 6,062,534, and/or 6,901,961, which are incorporated herein by specific reference.

Referring also to FIGS. 2-5, valve body modules 12 and/or gaskets 14 are preferably interchangeable and, in some embodiments, are even substantially identical. For example, the valve body modules 12 and/or gaskets 14 may be identical, thereby allowing assembly, and/or rebuilding, of the valve 10 in the field with minimal numbers of different components. Such capability makes the spool valve 10 of the present invention a versatile, efficient, and easy to implement and maintain component to the process control system.

The modules 12 may have one or more mating surfaces 16,18, one or more exterior surfaces 20 extending between the mating surfaces 16,18, at least one main valve cavity 22 communicating between the mating surfaces 16,18, a main port 24 communicating between the exterior surface 20 and the main valve cavity 22, and a plurality of separate cross valve communication ports 26a,26b,26c,26d communicating between the mating surfaces 16,18. As shown, the modules 12 are generally cylindrical. However, the modules 12 may be rectangular or some other shape to accommodate certain applications.

The mating surfaces 16,18 are preferably flat and smooth in order to facilitate a good seal to ensure reliable operation of the valve 10. As shown, the mating surfaces 16,18 may be circular, parallel, and/or opposing. However, in other embodiments, the mating surfaces 16,18 may be of other shapes, such as triangular or rectangular, and/or may be at various angles with respect to each other. As shown, the exterior surface 20 may extend from one of the mating surfaces 16,18 to the other. However, the exterior surface may extend only partially between the mating surfaces 16,18, may extend beyond the mating surfaces 16,18, and/or may be offset with respect to the mating surfaces 16,18. For example, the exterior surface 20 may extend beyond both mating surfaces 16,18 forming one or more flanges 28 about the perimeter of the mating surfaces 16,18. These flanges 28 may provide protection to other components of the valve 10, such as the gasket 14 which will be discussed in greater detail below.

The main valve cavity 22 preferably passes through the valve body modules 12 from one mating surface 16,18 to the other. As such, the main valve cavity 22 may extend through most of the valve 10 and is preferably configured to accept a portion of a spool and/or other operator (not shown), such as a solenoid plunger, to operate the valve 10. More specifically, the main valve cavity 22 may extend through each valve body module 12, gasket 14, and/or one or more endcaps (not shown). A process control fluid, such as a hydraulic fluid or a compressed gas or air, flows through the valve 10 according to the position of the spool, or operator, and exits or enters one or more ports of the valve 10, such as an input port, an output port, an exhaust port, and/or a common port, as will be discussed in greater detail below.

The main port 24 passes from the main valve cavity 22 and an exterior of the valve 10, such as the exterior surface 20 of the valve body module 12. Thus, the main port 24 is one way in which the valve body modules 12, and thus the valve 10, communicate(s) with a process control system. More specifically, depending on the configuration of the valve 10, the main port 24 of any one of the valve body modules 12 may function as input port, an output port, an exhaust port, a common port, or another port used in process control valves, as will be discussed in greater detail below. Whether or not the main port 24 communicates the process control fluid is determined by the position of the spool, or operator.

The cross valve communication ports 26a,26b,26c,26d preferably pass through the valve body modules 12 from one mating surface 16,18 to the other. As such, the cross valve communication ports 26a,26b,26c,26d may extend through most of the valve 10 and are preferably configured to communicate an input pressure, an output pressure, an exhaust pressure, a common pressure, or other pressure throughout the valve 10, as experienced at the input port, output port, exhaust port, common port, or other port. More specifically, the cross valve communication ports 26a,26b,26c,26d preferably communicate their pressures individually, in isolation from each other and/or the main valve cavity 22 across the valve body modules 12, except as discussed below. Thus, in one embodiment, the cross valve communication ports 26a, 26b,26c,26d are isolated from each other and the main valve cavity 22 within the confines of each valve body module 12.

In one embodiment, the valve body modules 12 include a passage 30 communicating between the main valve cavity 22 and one of the two mating surfaces 16,18. As shown, the passage 22 only penetrates one of the mating surfaces 16, not both. This feature provides certain valve functionality which will be discussed in greater detail below. However, in some applications, it may be desirable for the passage 30 to communicate between both mating surfaces 16,18 and/or between the main valve cavity 22 and both of the two mating surfaces 16,18. As will be discussed in greater detail below, the passages 30 may be used to communicate between the main valve cavity 22 and one or more of the cross valve communication ports 26a,26b,26c,26d, through the gasket 14, and thereby communicate the input pressure, output pressure, exhaust pressure, common pressure, or other pressure throughout the valve 10.

The valve body modules 12 also preferably includes one or more fastener features 32. For example, in the embodiment shown, the valve body modules 12 include two through holes 32, through which bolts may be passed to assemble the valve 10.

In one embodiment, the valve body modules 12 are machined from 316L stainless steel and are approximately two and a half inches in diameter and approximately one inch thick. However, the valve body modules 12 may be manufactured using different processes, materials, shapes, and/or dimensions depending on the application for which they are designed.

Figure 6:
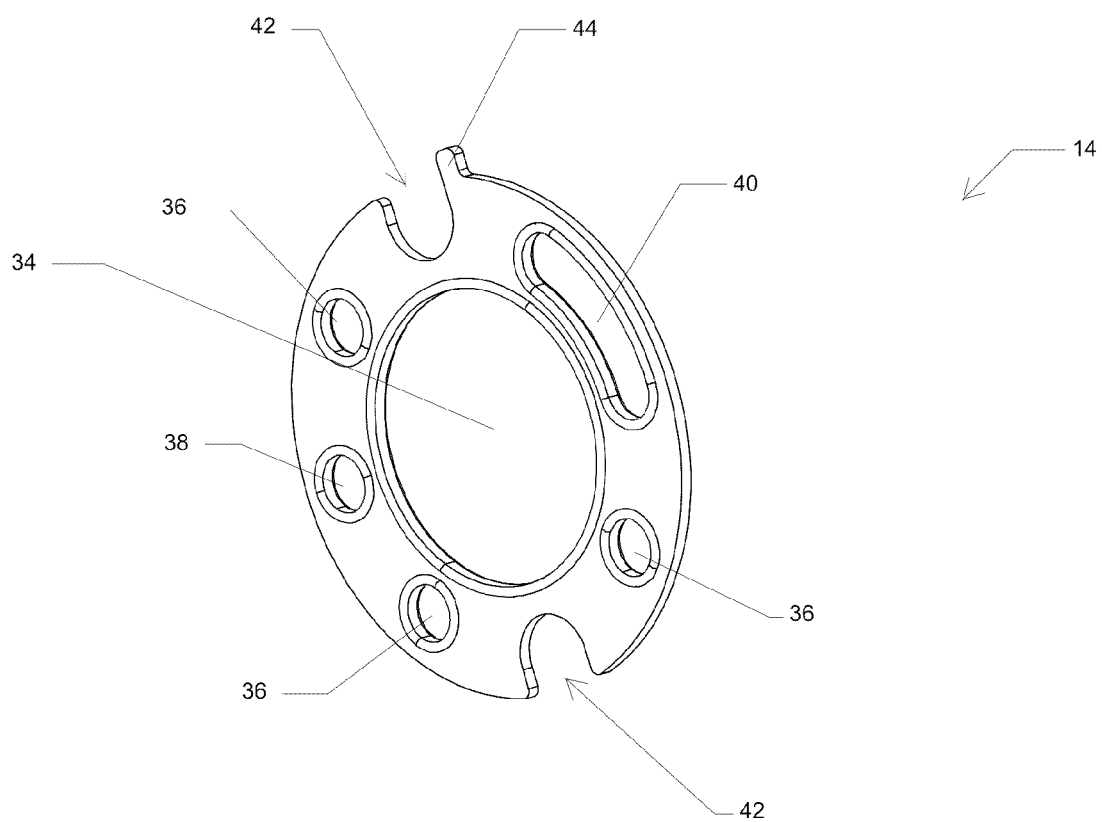
FIG. 6 illustrates a perspective view of a particular embodiment of a gasket utilizing certain aspects of the present inventions.
Figure 7:
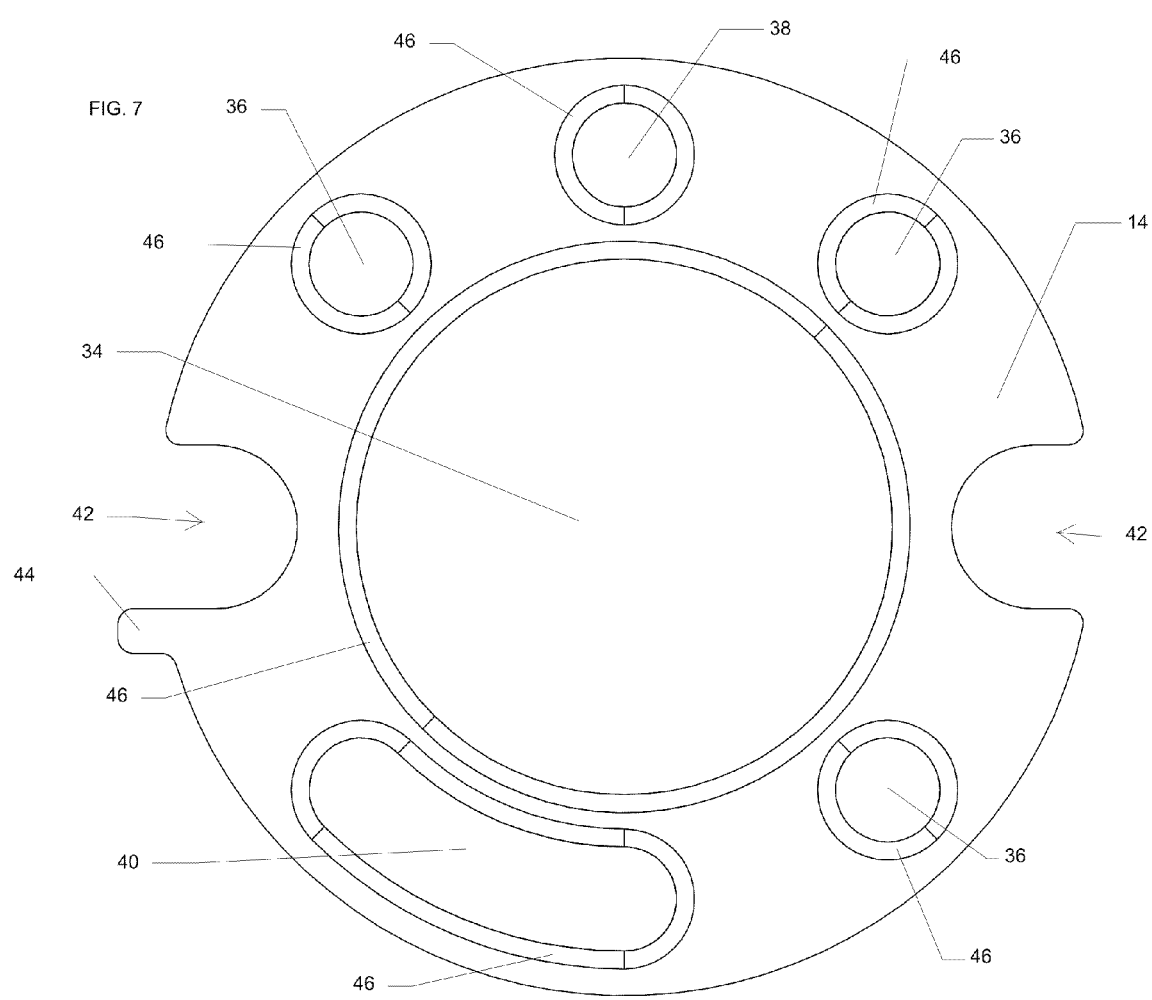
FIG. 7 illustrates an elevation view of a particular embodiment of the gasket utilizing certain aspects of the present inventions.

Referring also to FIGS. 6 and 7, the gasket(s) 14 may be sized and shaped to seal the mating surface 16 of one valve body module 12 to the mating surface 18 of another, adjacent valve body module 12. Thus, the gasket(s) 14 are preferably disposed between adjacent mating surfaces 16,18. The gasket(s) 14 may also be configured to individually communicate the main valve cavity 22 and the cross valve communication ports 26a,26b,26c,26d between adjacent valve body modules 12. More specifically, the gasket(s) 14 may isolate the main valve cavity 22 and the cross valve communication ports 26a,26b,26c,26d from each other while allowing their individual communication between adjacent valve body modules 12. Thus, the gasket(s) 14 may have a main valve cavity opening 34 and a plurality of cross valve communication port openings 36. In some embodiments, the gasket(s) 14 may also have one or more passage openings 38, to communicate the passage(s) 30 between adjacent valve body modules 12.

The gasket(s) 14 may further be configured to selectively communicate between the main valve cavity 22 and a selected one of the cross valve communication ports 26a,26b,26c,26d. For example, in one embodiment, the gasket(s) 14 may allow communication between the main valve cavity opening 34 and one of the cross valve communication port openings 36. In another embodiment, as shown, the gasket(s) 14 may include an elongated opening 40 that allows communication between the passage 30 and the selected one of the cross valve communication ports 26a,26b,26c,26d. In other words, the elongated opening 40 spans both a cross valve communication port opening 36 and a passage opening 38, thereby allowing communication between the passage 30 and the selected one of the cross valve communication ports 26a,26b,26c,26d. Because the passage 30 is in communication with the main valve cavity 22 of the associated valve body modules 12, the gasket(s) 14 thereby may be configured to selectively allow communication between the main valve cavity 22 and the selected one of the cross valve communication ports 26a,26b, 26c,26d.

Figure 8:
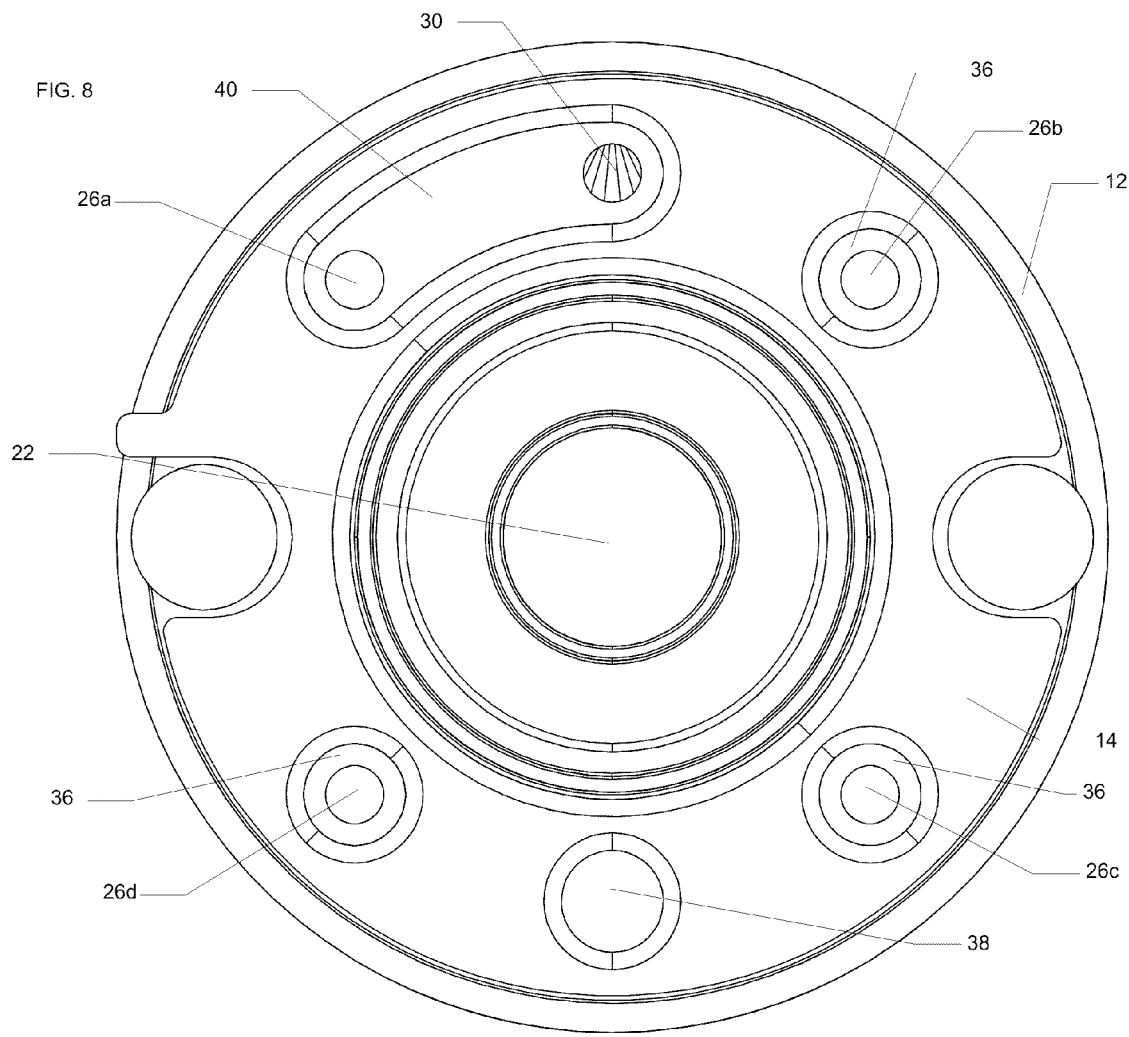
FIG. 8 illustrates a first orientation of the gasket with respect to the valve body module utilizing certain aspects of the present inventions.

The selected one of the cross valve communication ports 26a,26b,26c,26d is dependant upon the orientation of the gasket 14. For example, referring also to FIGS. 8, 9,10, and 11, the gasket 14 may be oriented in any one of a plurality of orientations, and thereby selectively communicate between the main valve cavity 22, such as through the passage 30, and a selected one of the cross valve communication ports 26a, 26b,26c,26d. More specifically, as shown in FIG. 8, the gasket 14 may be configured in a first orientation and thereby facilitate communication between the main valve cavity 22 and a first one of the cross valve communication ports 26a. For example, the elongated opening 40 defines a communication path between the passage 30 and the first one of the cross valve communication ports 26a, in the first orientation. As can be seen, the remaining cross valve communication ports 26b,26c,26d remain isolated from the passage 30, the main valve cavity 22, and each other.

Figure 9:
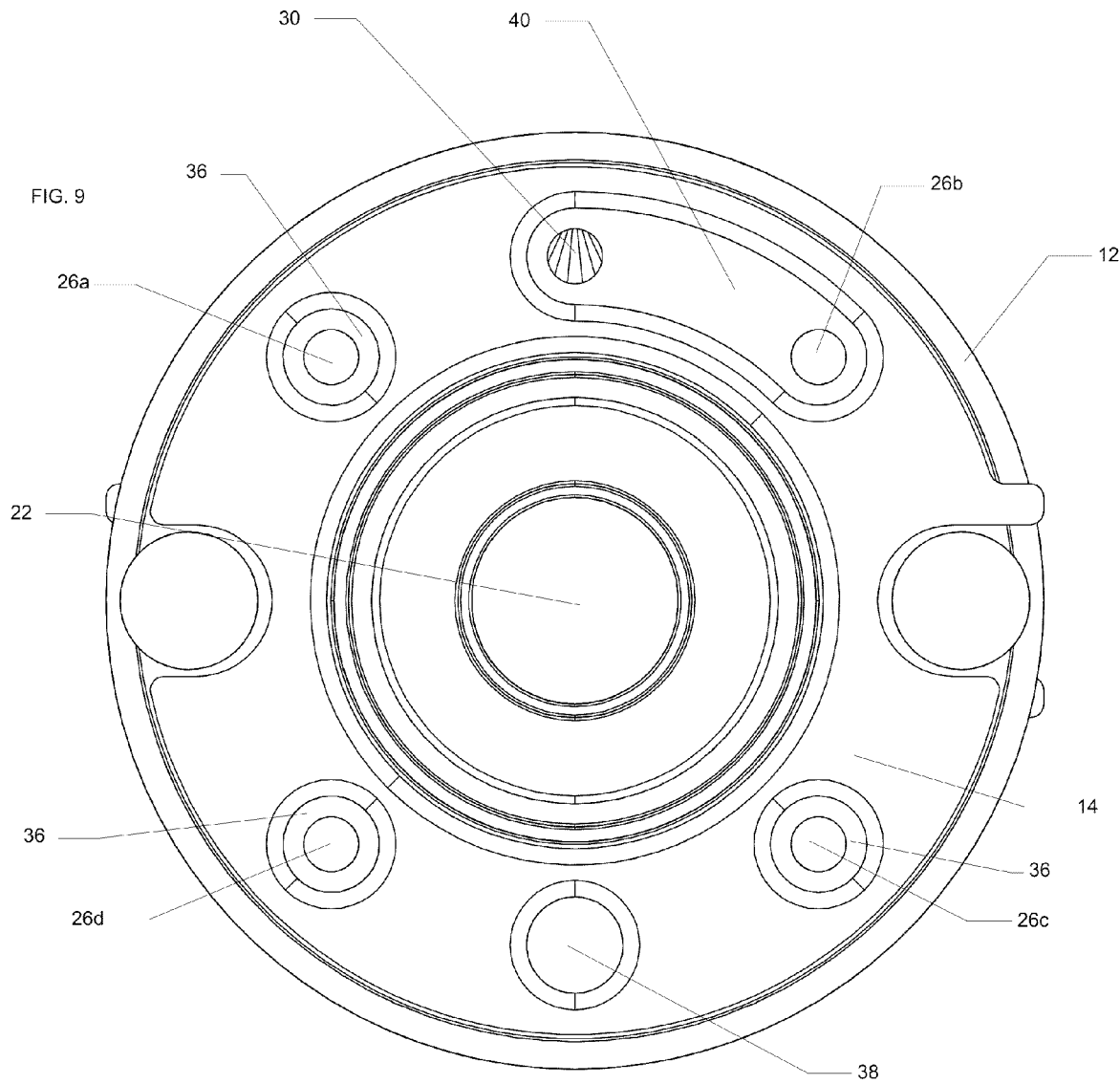
FIG. 9 illustrates a second orientation of the gasket with respect to the valve body module utilizing certain aspects of the present inventions.

As shown in FIG. 9, the gasket 14 may be configured in a second orientation and thereby facilitate communication between the main valve cavity 22 and a second one of the cross valve communication ports 26b. For example, the elongated opening 40 defines a communication path between the passage 30 and the second one of the cross valve communication ports 26b, in the second orientation. As can be seen, the remaining cross valve communication ports 26a,26c,26d remain isolated from the passage 30, the main valve cavity 22, and each other.

Figure 10:
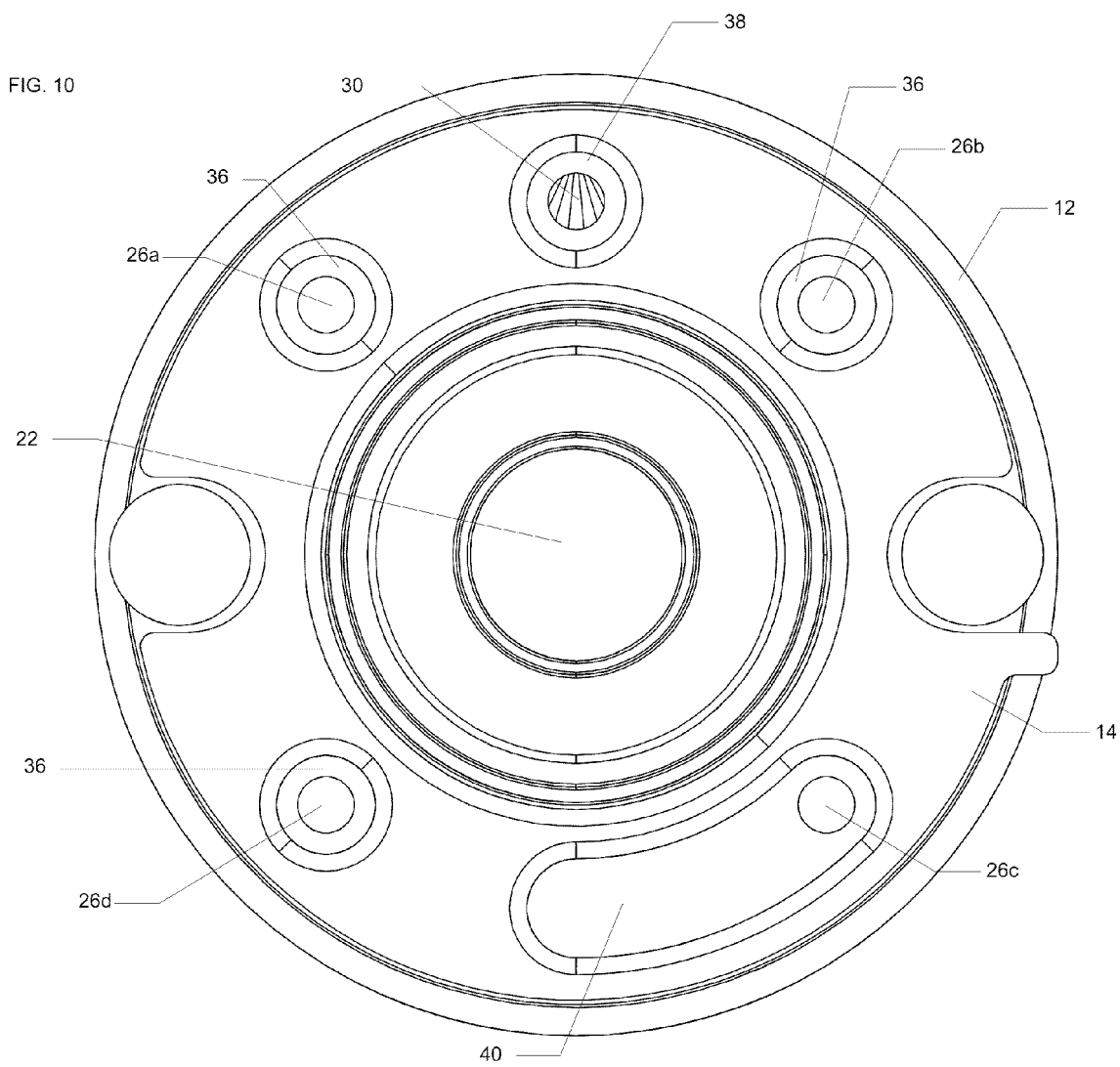
FIG. 10 illustrates a third orientation of the gasket with respect to the valve body module utilizing certain aspects of the present inventions.
Figure 11:
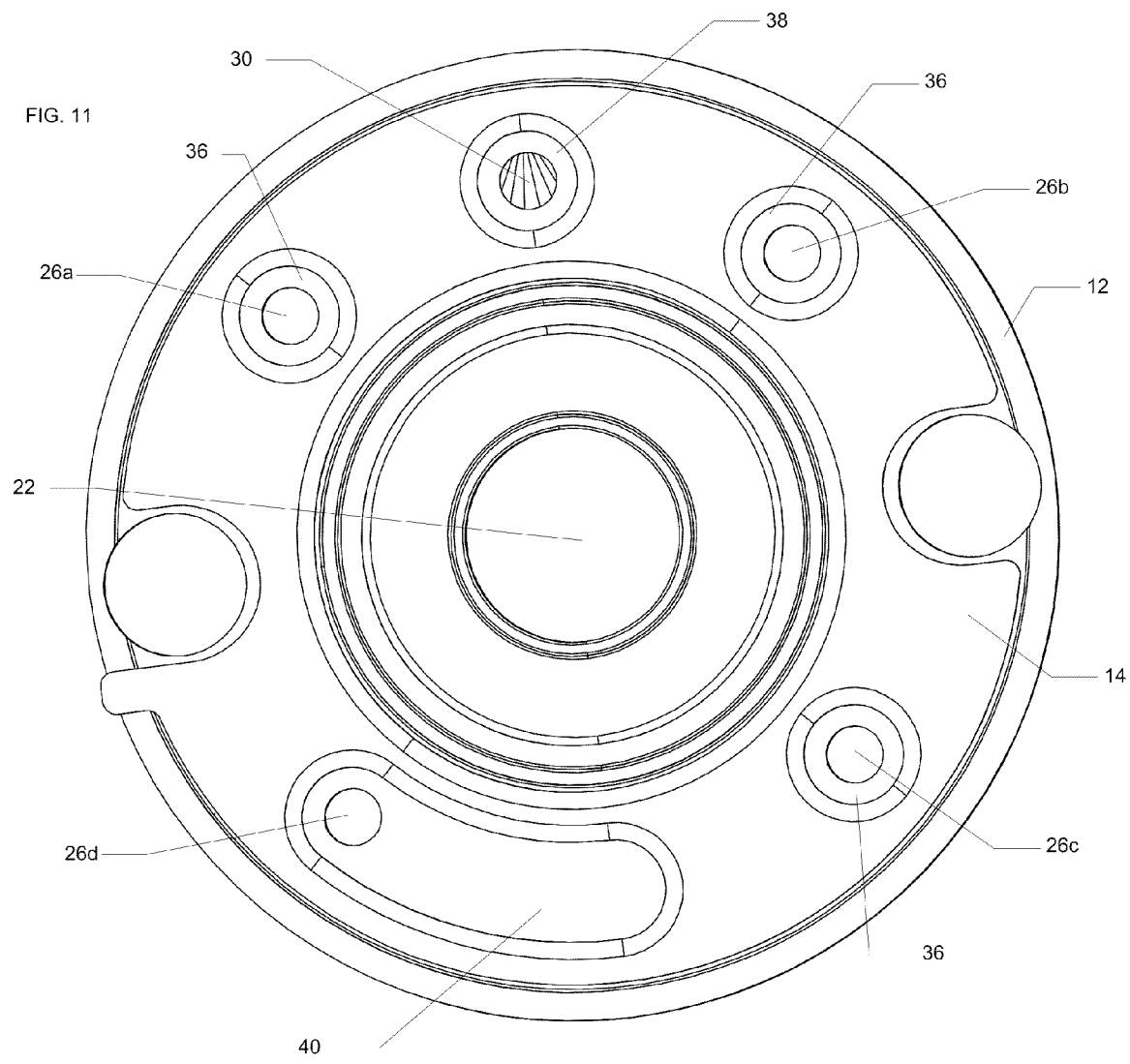
FIG. 11 illustrates a fourth orientation of the gasket with respect to the valve body module utilizing certain aspects of the present inventions.

As shown in FIGS. 10 and 11, the gasket 14 may be configured in a third or fourth orientation and thereby isolate the cross valve communication ports 26a,26b,26c,26d from the passage 30, the main valve cavity 22, and each other. In these orientations, the passage opening 38 coincides with the passage 30, but does not communicate to any other cavities or ports. Similarly, in these orientations, the elongated opening 40 coincides with one of the cross valve communication ports 26c,26d, but does not communicate to any other cavities or ports.

As shown in FIGS. 6 and 7, the gasket(s) 14 also preferably include one or more fastener features 42. For example, in the embodiment shown, the gasket(s) 14 include cutouts 42, through which bolts may be passed to assemble the valve 10. The gasket(s) 14 may also include one or more tabs 44 that assist in assembling the valve 10 and/or identifying the orientation of the gasket 14 without disassembling the valve 10. More specifically, as shown, the tab 44 may be between one of the cutouts 42 and the elongated opening 40, thereby identifying the location of the elongated opening 40 and the orientation of the gasket 14, while the gasket 14 is housed within, or otherwise concealed by, the valve body modules 12 and/or other components of the valve 10.

The gasket(s) 14 may be molded from a resilient material, such as an elastomer and/or an thermoplastic. To enhance their sealing capabilities, the gaskets 14 may have ridges 46 around each of the openings 34,36,38,40. The gasket(s) 14 are preferably sized and shaped to match the mating surfaces 16,18, and fit within the cavity created by the flanges 28 of adjacent valve body modules 12 when compressed during assembly of the valve 10. However, the gasket(s) 14 may be manufactured using different processes, materials, shapes, and/or dimensions depending on the application for which they are designed.

Figure 12:
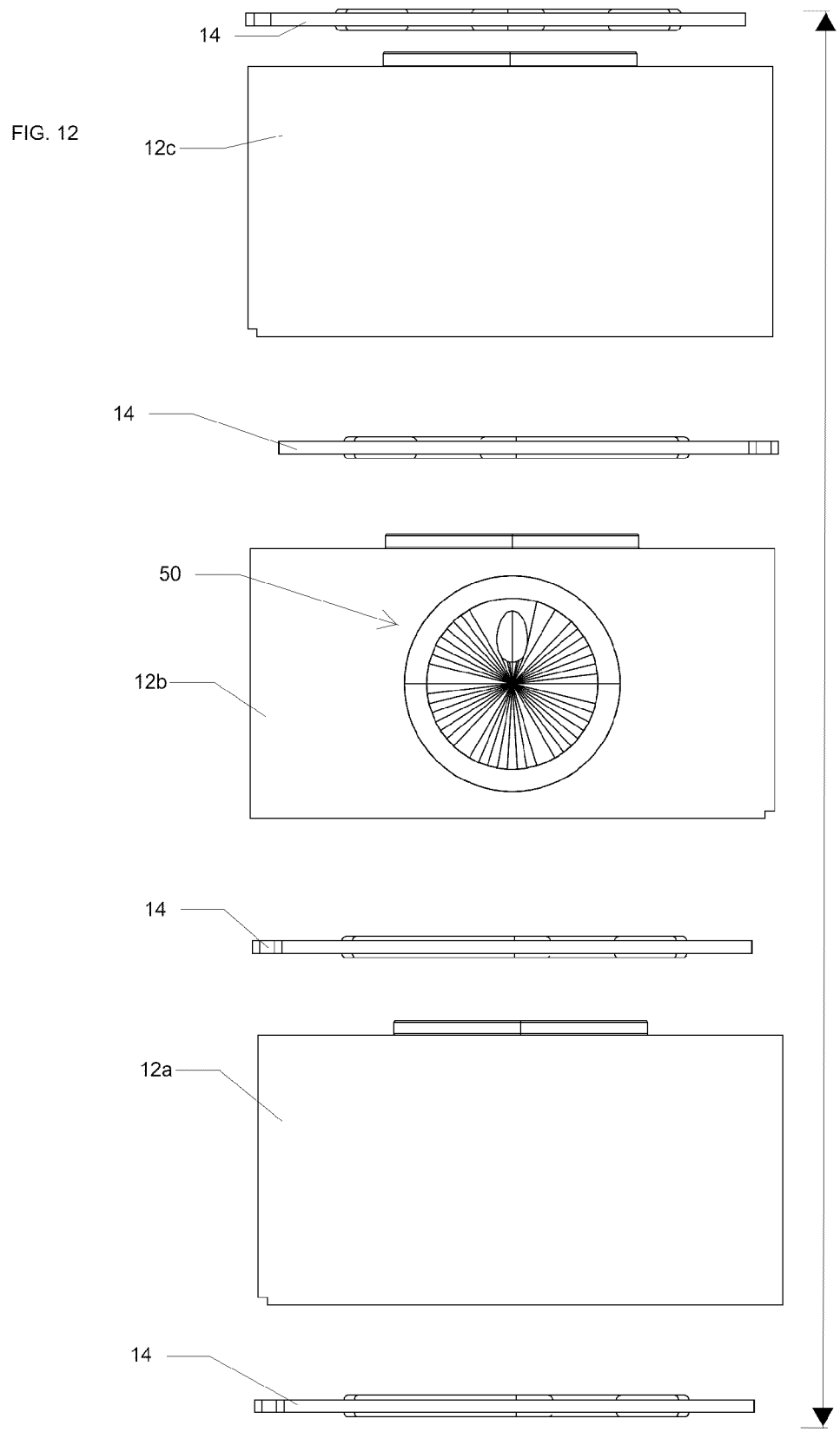
FIG. 12 illustrates a first exploded view of a particular embodiment of select components of the modular spool valve utilizing certain aspects of the present inventions.
Figure 13:
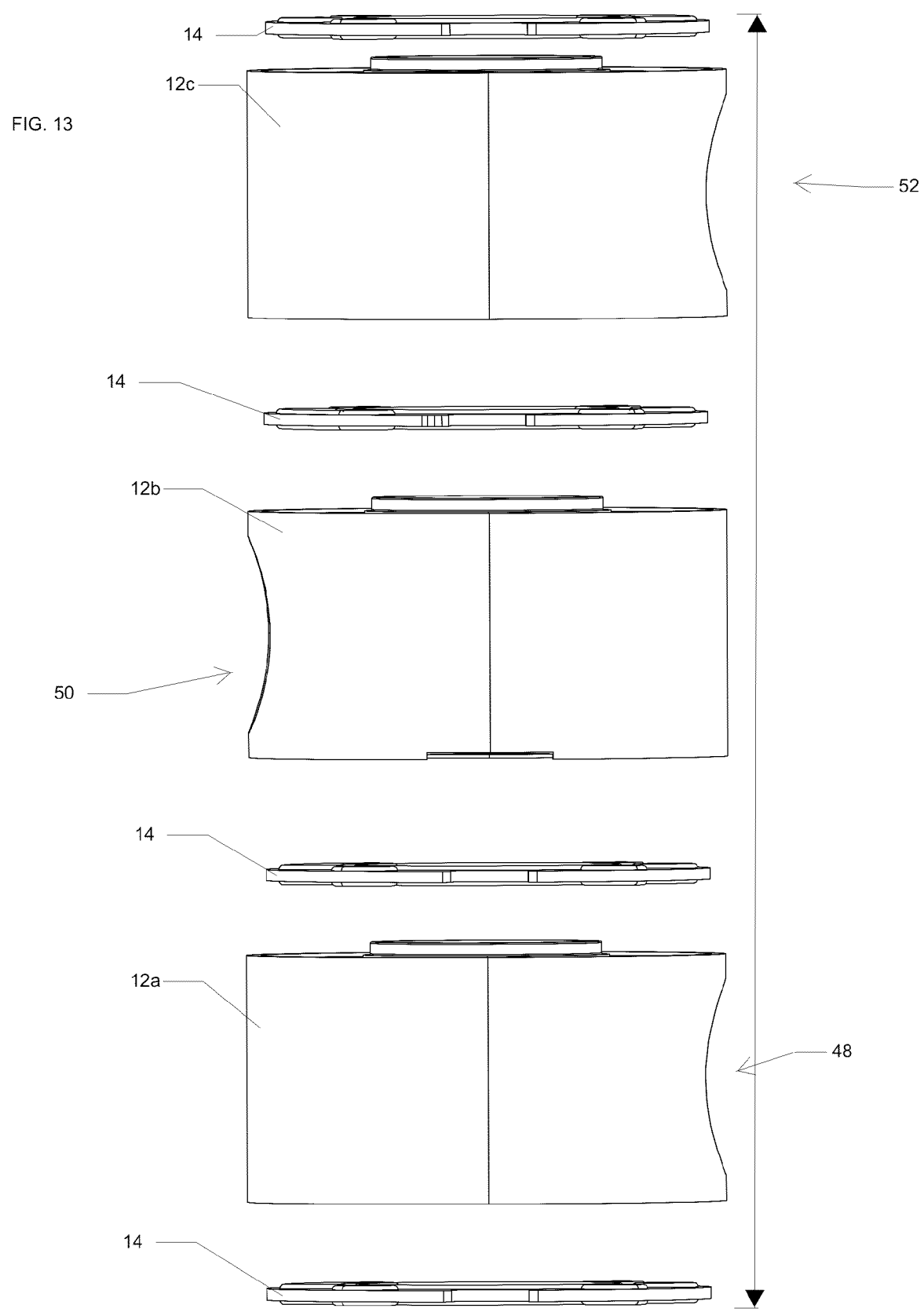
FIG. 13 illustrates a second exploded view of a particular embodiment of select components of the modular spool valve utilizing certain aspects of the present inventions.
Figure 14:
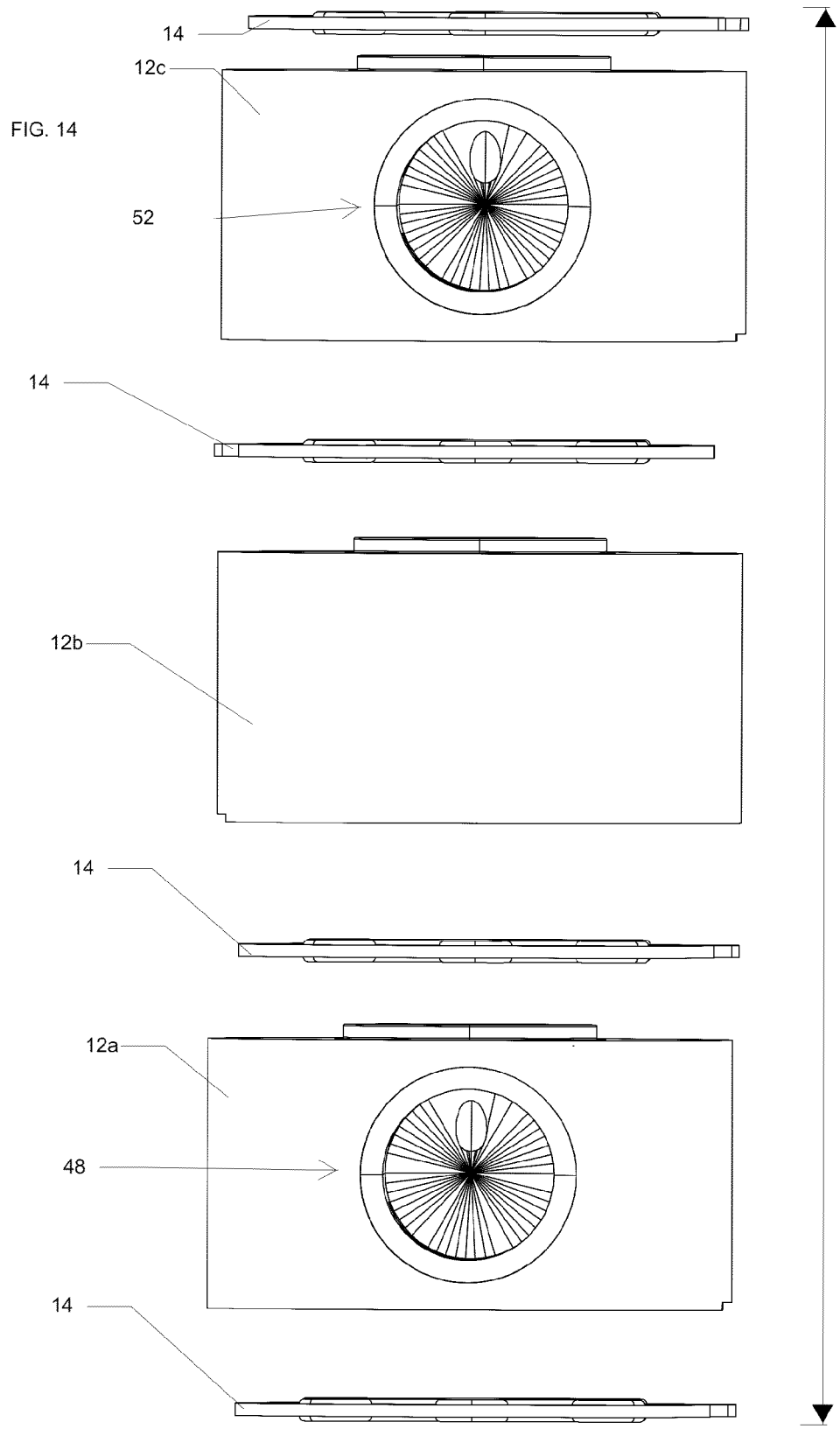
FIG. 14 illustrates a third exploded view of a particular embodiment of select components of the modular spool valve utilizing certain aspects of the present inventions.

The valve body modules 12 and gaskets 14 may be assembled to form various process control valves. For example, referring also the FIGS. 12, 13, and 14, three valve body modules 12 may be assembled with a plurality of gaskets 14, four being shown. Such an assembly may be configured as a two-way three port valve. More specifically, a first one of the valve body modules 12 may be used as an input module 12a, such that its main port 24 functions as an input port 48 of the valve 10. A second one of the valve body modules 12 may be used as a common module 12b, such that its main port 24 functions as a common port 50 of the valve 10. A third one of the valve body modules 12 may be used as an exhaust module 12c, such that its main port 24 functions as an exhaust port 52 of the valve 10.

Figure 15:
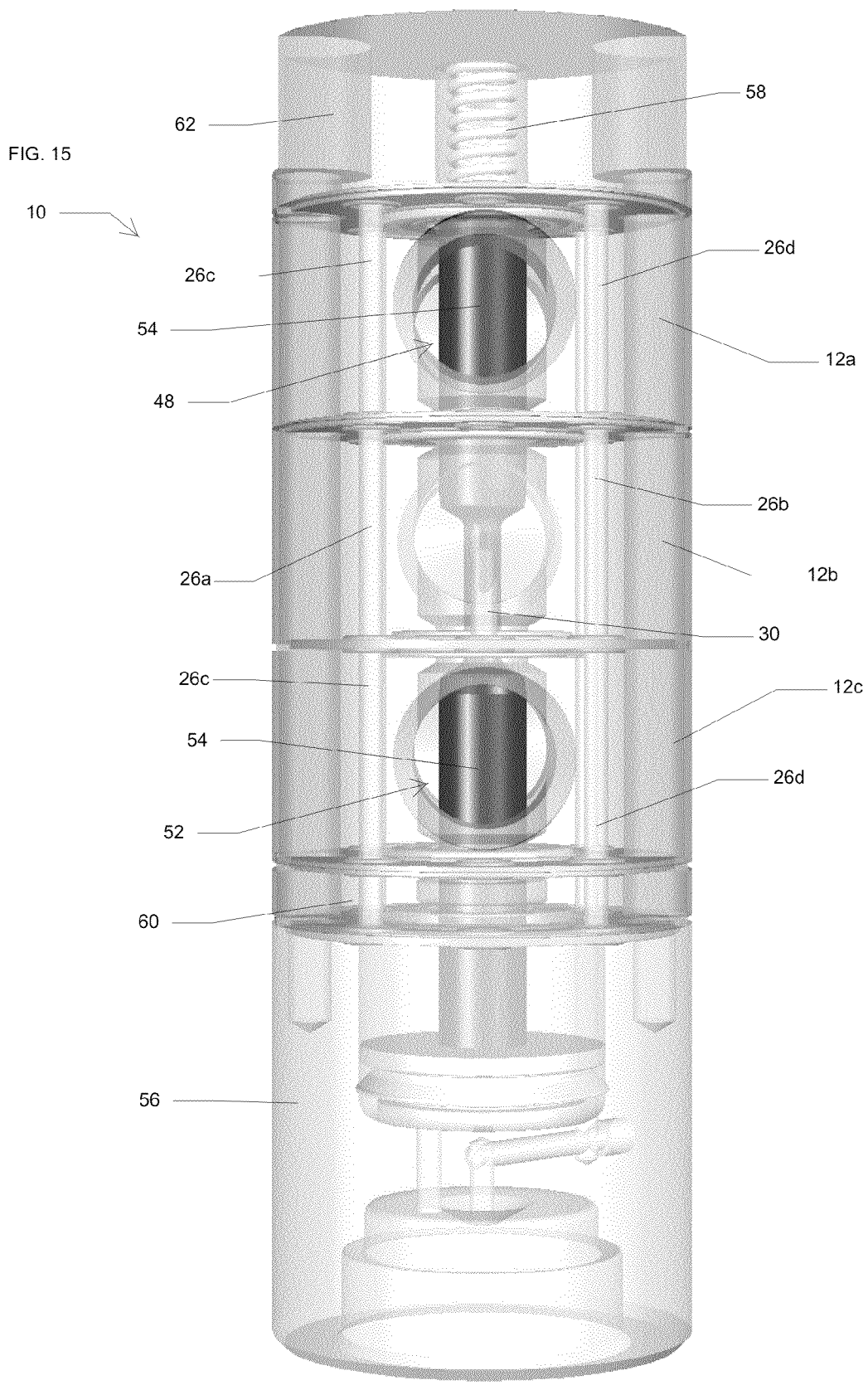
FIG. 15 illustrates a first partially transparent plan view of select components of an assembled embodiment of the modular spool valve utilizing certain aspects of the present inventions.
Figure 16:
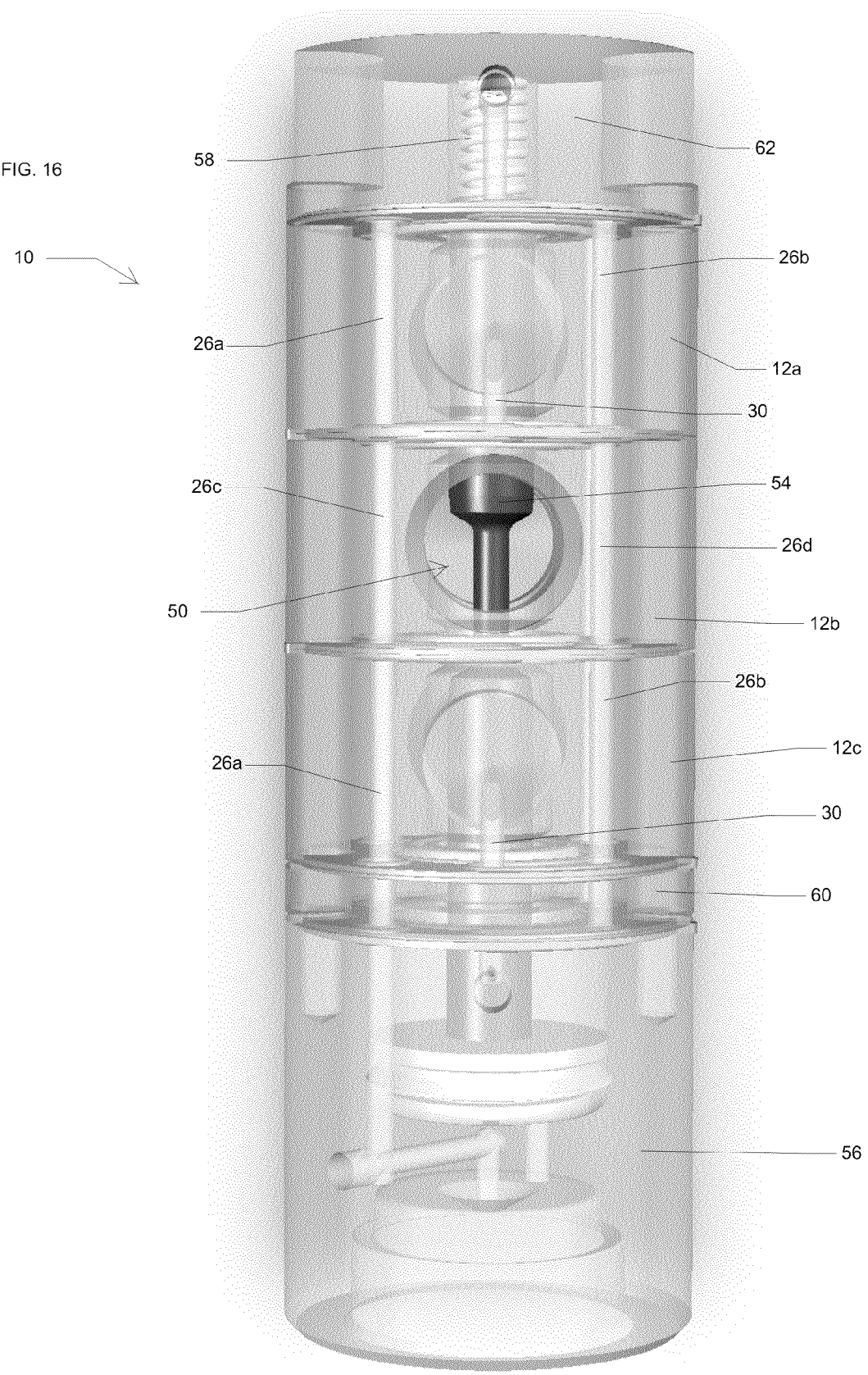
FIG. 16 illustrates a second partially transparent plan view of select components of an assembled embodiment of the modular spool valve utilizing certain aspects of the present inventions.

Referring also to FIGS. 15 and 16, such an assembled valve 10 may also include a spool 54 to selectively open and close the ports 48,50,52 of, or otherwise operate, the valve 10. The valve 10 may also include an operator 56, such as a solenoid, to manipulate the spool 54, and thereby operate the valve 10. The operator 56 may work against a spring 58, or some other mechanism to provide a normal position for the valve 10. Select ones of these components may be housed in, or function through, one or more endcaps 60,62.

It can be seen that, in this configuration, the first, input module 12a is oriented in a first direction, the second, common module 12b is oriented in a second direction, and the third, exhaust module 12c is oriented in the first direction. It can also be seen that the first and second directions are opposing, or 180 degrees apart. Because they are so aligned, the cross valve communication ports 26a,26b,26c,26d of the first, input module 12a and the third, exhaust module 12c are aligned and communicate with the respective cross valve communication ports 26a,26b,26c,26d both modules. However, because the second, common module 12b is oriented opposite that of the first, input module 12a and the third, exhaust module 12c, the cross valve communication ports 26a,26b,26c,26d are exchanged. More specifically, the first cross valve communication port 26a, of the first, input module 12a and the third, exhaust module 12c, communicates with the cross valve communication port 26c, of the second, common module 12b. The second cross valve communication port 26b, of the first, input module 12a and the third, exhaust module 12c, communicates with the cross valve communication port 26d, of the second, common module 12b. Similarly, cross valve communication port 26d, of the first, input module 12a and the third, exhaust module 12c, communicates with the cross valve communication port 26b, of the second, common module 12b. Finally, cross valve communication port 26c, of the first, input module 12a and the third, exhaust module 12c, communicates with the cross valve communication port 26a, of the second, common module 12b. However, it can be seen that the valve body modules 12 and gaskets 14 still provide individual communication through each the valve body module 12 to each end of the valve.

Figure 17:
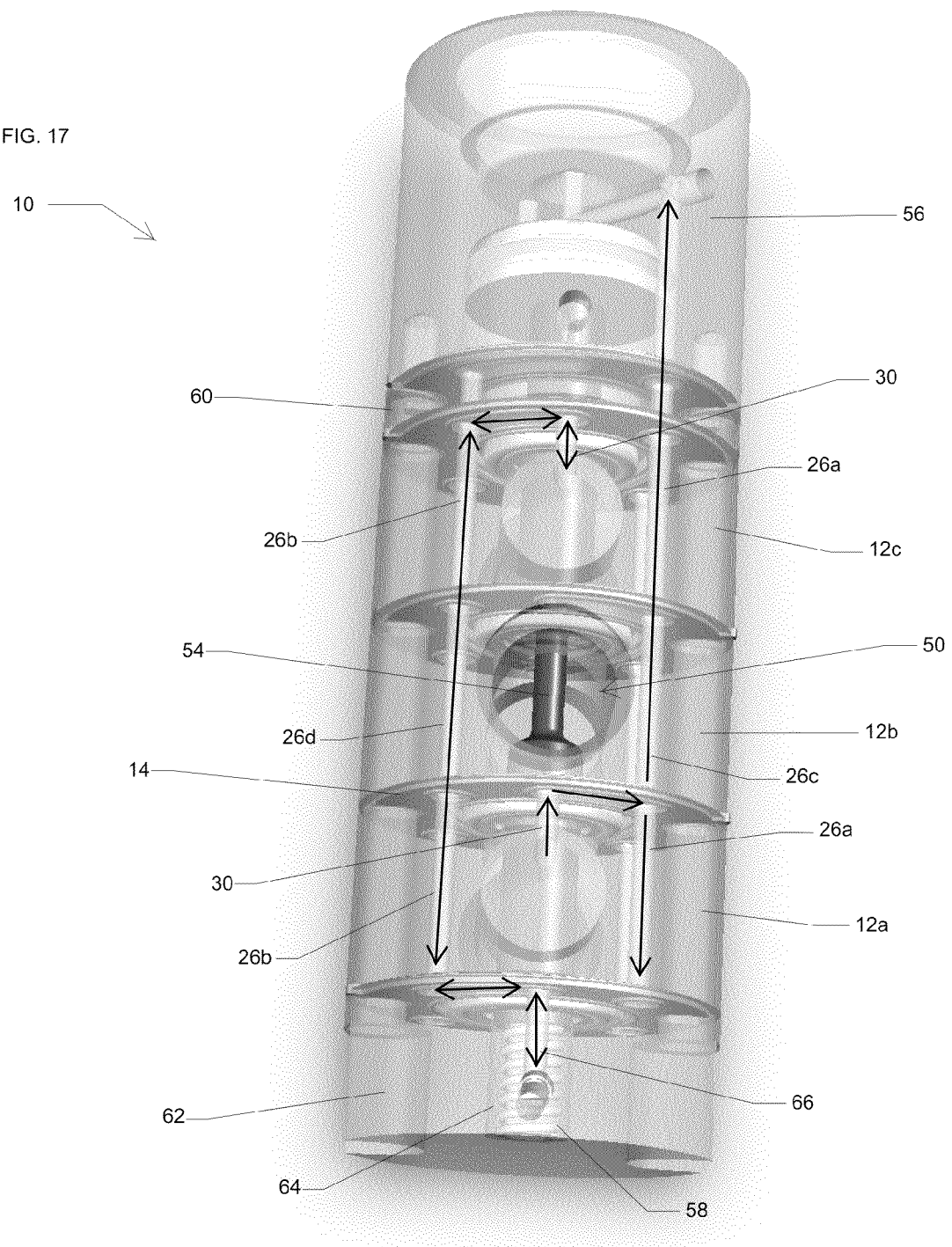
FIG. 17 illustrates a first partially transparent perspective view of select components of an assembled embodiment of the modular spool valve utilizing certain aspects of the present inventions.
Figure 18:
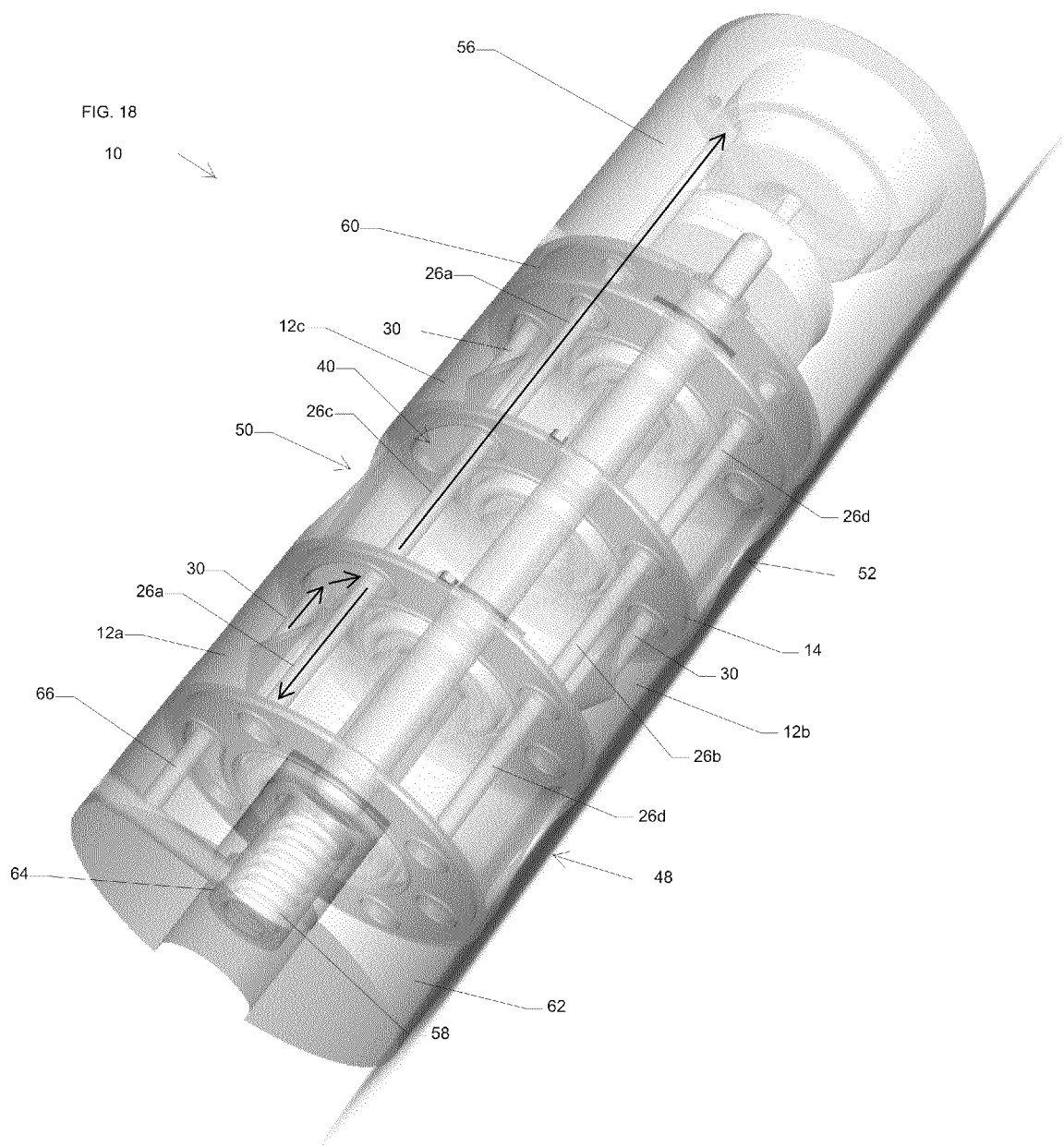
FIG. 18 illustrates a second partially transparent perspective view of select components of an assembled embodiment of the modular spool valve utilizing certain aspects of the present inventions.

Referring also the FIGS. 17 and 18, when used in a process control system, the valve 10 would normally receive an input pressure on its input port 48. This input pressure communicates into the valve 10 through the input port 48. More specifically, this input pressure communicates into the main port 24 of the first, input module 12a, which comprises the input port 48 of the valve 10. Referring also the FIGS. 17 and 18, this input pressure is communicated into the main valve cavity 22 of the input module 12a, and is thus communicated to the passage 30 of the input module 12a. This input pressure is then communicated from the passage 30 to the first cross valve communication port 26a, through the elongated opening 40 of the gasket 14. This input pressure is then distributed throughout the valve 10 through the cross valve communication ports 26a,26b,26c,26d. More specifically, with the gasket 14 in the first orientation, the input pressure is communicated from the passage 30 to the first cross valve communication port 26a of the first, input module 12a, the cross valve communication port 26c of the second, common module 12b, and the first cross valve communication port 26a of the third, exhaust module 12c. In this manner, the input pressure is communicated from the process control system, through the input port 48, or main port 24 of the input module 12a, through the main cavity 22, through the passage 30, through the elongated opening 40 of the gasket 14, to the first cross valve communication port 26a where it is distributed throughout the valve 10. As can be seen, the input pressure may also be communicated into the operator 56, which allows the valve 10 to include an internal pilot, assisting the operator 56 with control of the valve 10.

Similarly, the valve 10 would normally exhaust an exhaust pressure through its exhaust port 52. This exhaust pressure communicates from the valve 10 through the exhaust port 52. More specifically, a common, or cylinder, pressure is typically communicated into the valve 10 through the common, or cylinder port 50, which may be used to control a diaphragm or some other mechanism to open a valve or take some other action within the process control system. When the cylinder pressure is communicated through the common port 50 it flows into the main cavity 22 of the second, common valve module 12b, where the spool 54 selectively allows the common pressure to be communicated to the main cavity 22 of the third, exhaust module 12c thus becoming the exhaust pressure. This exhaust pressure may also be communicated from the main valve cavity 22 to the passage 30 of the exhaust module 12c. This exhaust pressure is further communicated from the passage 30 to the second cross valve communication port 26b, through the elongated opening 40 of the gasket 14. This exhaust pressure is likewise distributed throughout the valve 10 through the cross valve communication ports 26a, 26b, 26c, 26d. More specifically, with the gasket 14 in the second orientation, the exhaust pressure is communicated from the passage 30 to the second cross valve communication port 26b of the third, exhaust module 12c, the cross valve communication port 26d of the second, common module 12b, and the second cross valve communication port 26b of the first, input module 12a. In this manner, the exhaust pressure is communicated through the exhaust port 48, or main port 24 of the input module 12a, as well as through the main cavity 22, through the passage 30, through the elongated opening 40 of the gasket 14, through the second cross valve communication port 26b where it is distributed throughout the valve 10.

Often the exhaust pressure is vented out the exhaust port 52, or main port 24 of the third, exhaust module 12c. In some applications, this may be vented to atmosphere. However, in other applications, such as corrosive or caustic environments, external, or atmospheric, venting can be problematic. In these situations, it is common to capture the exhaust pressure from the exhaust port 52.

As can be seen, the exhaust pressure may be communicated to the spring 58, spring end of the spool 54, and endcap 62. As one would readily understand the endcap 62 with the spring 58 therein should be vented, in some manner, to allow the spring 58 to compress and the spool 54 to move. In some applications, this may also be vented to atmosphere. However, the present invention further allows the containment, or capture, of spring vent pressure. More specifically, a spring cavity 64 in the spring containing endcap 62 may include a passage 66 that communicates between the spring cavity 64 and a mating surface of the endcap 62. The elongated opening 40 of the gasket 14 may be oriented to allow communication between this passage 66 and the second cross valve communication port 26b, thereby providing communication between the spring cavity 64 and the exhaust port 52 which may be piped to a containment system. More specifically, with the gasket 14 in the second orientation, the spring vent pressure is communicated from the passage 66 to the second cross valve communication port 26b of the first, input module 12a, the cross valve communication port 26d of the second, common module 12b, and the second cross valve communication port 26b of the third, exhaust module 12c, where it may be captured along with the exhaust pressure.

Similarly, the second, common module 12b and associated gasket 14 may be configured to distribute the common, or cylinder pressure throughout the valve 10 through the cross valve communication ports 26a, 26b, 26c, 26d. More specifically, with the gasket 14 in the second orientation, the cylinder pressure is communicated from the passage 30 to the second cross valve communication port 26b of the second, common module 12b, the cross valve communication port 26d of the first, input module 12a, and the cross valve communication port 26d of the third, exhaust module 12c. Alternatively, with the gasket 14 in the first orientation, the cylinder pressure is communicated from the passage 30 to the first cross valve communication port 26a of the second, common module 12b, the cross valve communication port 26c of the first, input module 12a, and the cross valve communication port 26c of the third, exhaust module 12c. In another alternative, the common pressure (or any of the pressures) need not be communicated at all. For example, the passage 30 may be aligned with the passage opening 38, which together with the mating surface 18 of another module 12a, 12c, stops communication of the common pressure (or any of the pressures). Thus, the valve 10 of the present invention may be configured to individually communicate the input pressure, exhaust pressure, and/or the common, or cylinder, pressure through each of the valve body modules 12 to either endcap 60 of the valve 10.

Figure 19:
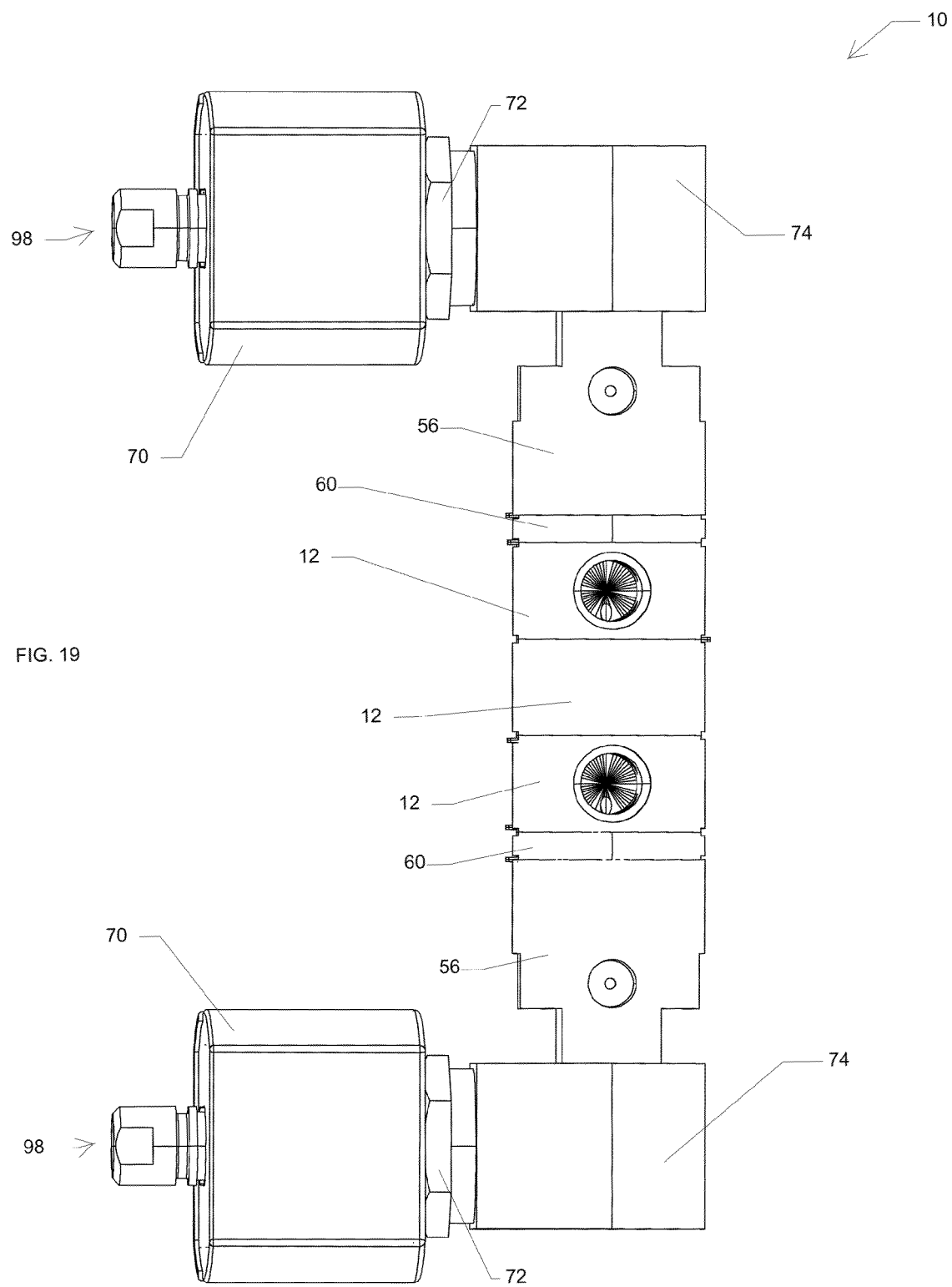
FIG. 19 illustrates an elevation view of a particular embodiment of the modular spool valve utilizing certain aspects of the present inventions.

Referring also the FIG. 19, the valve 10 may include two operators 56 to manipulate the spool 54, and thereby operate the valve 10. More specifically, rather than one operator 56 working against the spring 58, one operator 56 may work against another to operate the valve 10. The operators 56 may each work though one of the endcaps 60.

In some embodiments, the operators 56 may be directly or indirectly driven, or controlled, by a solenoid coil 70. Further, in some embodiments, the coils 70 may operate pilot valves 72 to manipulate the spool 54 and/or may rotate about the valve 10. More specifically, a solenoid mounting body 74 may be rotatably secured to the operator 56. The coils 70 may manipulate the pilot valves 72, which engage the solenoid mounting body 74. For example, in one embodiment, energizing and/or de-energizing the coils 70 may linearly shift one or more components of the pilot valves 72, thereby operating the pilot valves 72 to manipulate the spool 54 and operate the valve 10 through the operators 56.

Figure 20:
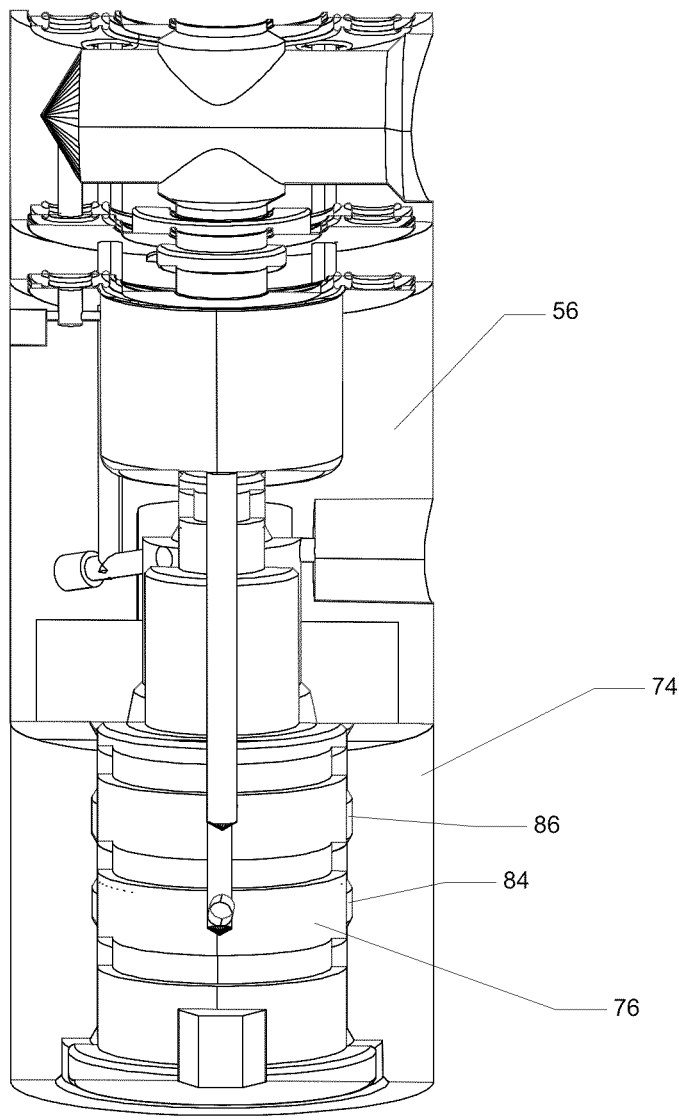
FIG. 20 illustrates a sectional view of select components of the modular spool valve utilizing certain aspects of the present inventions.
Figure 21:
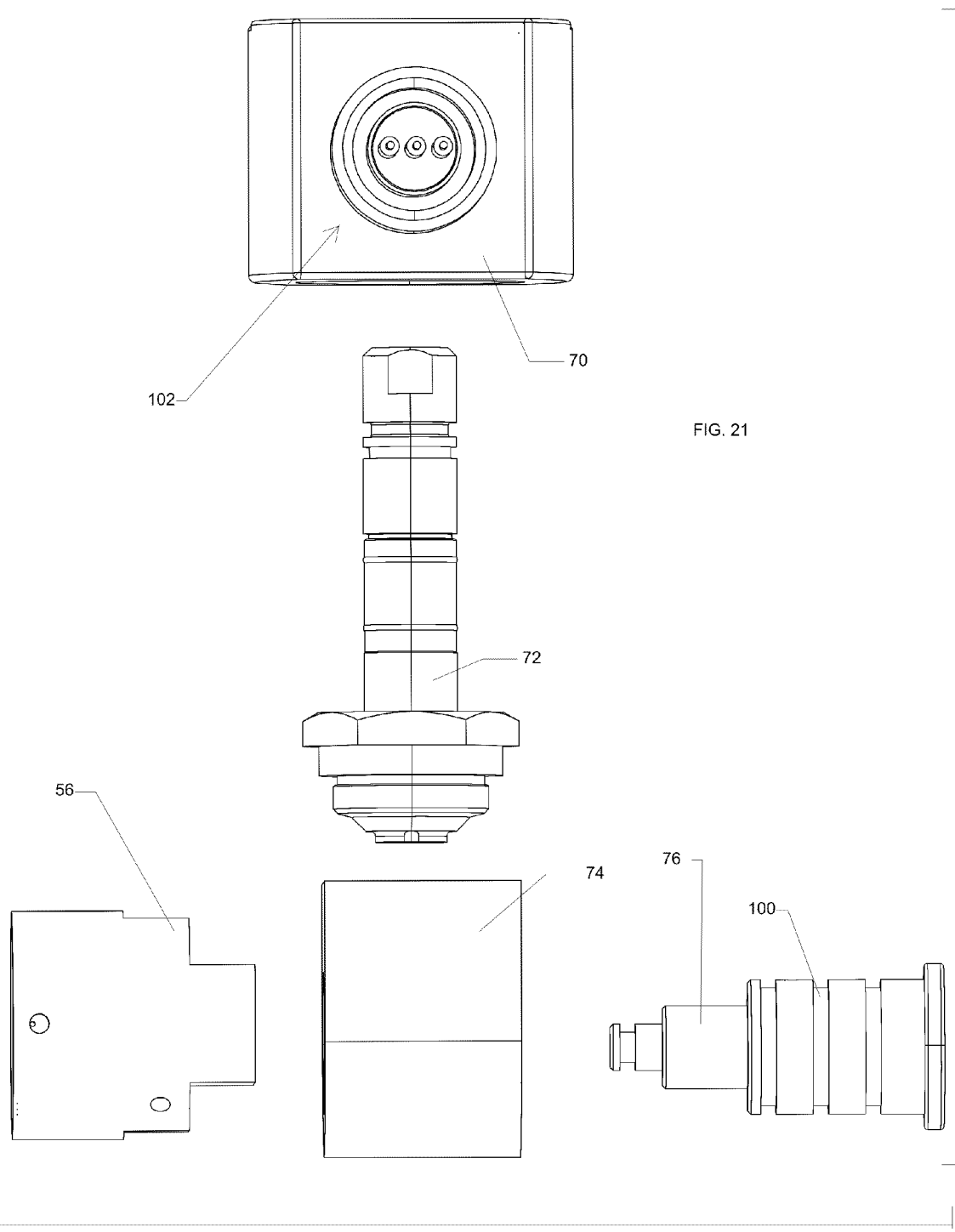
FIG. 21 illustrates an exploded view of a particular embodiment of select components of the modular spool valve utilizing certain aspects of the present inventions.
Figure 22:
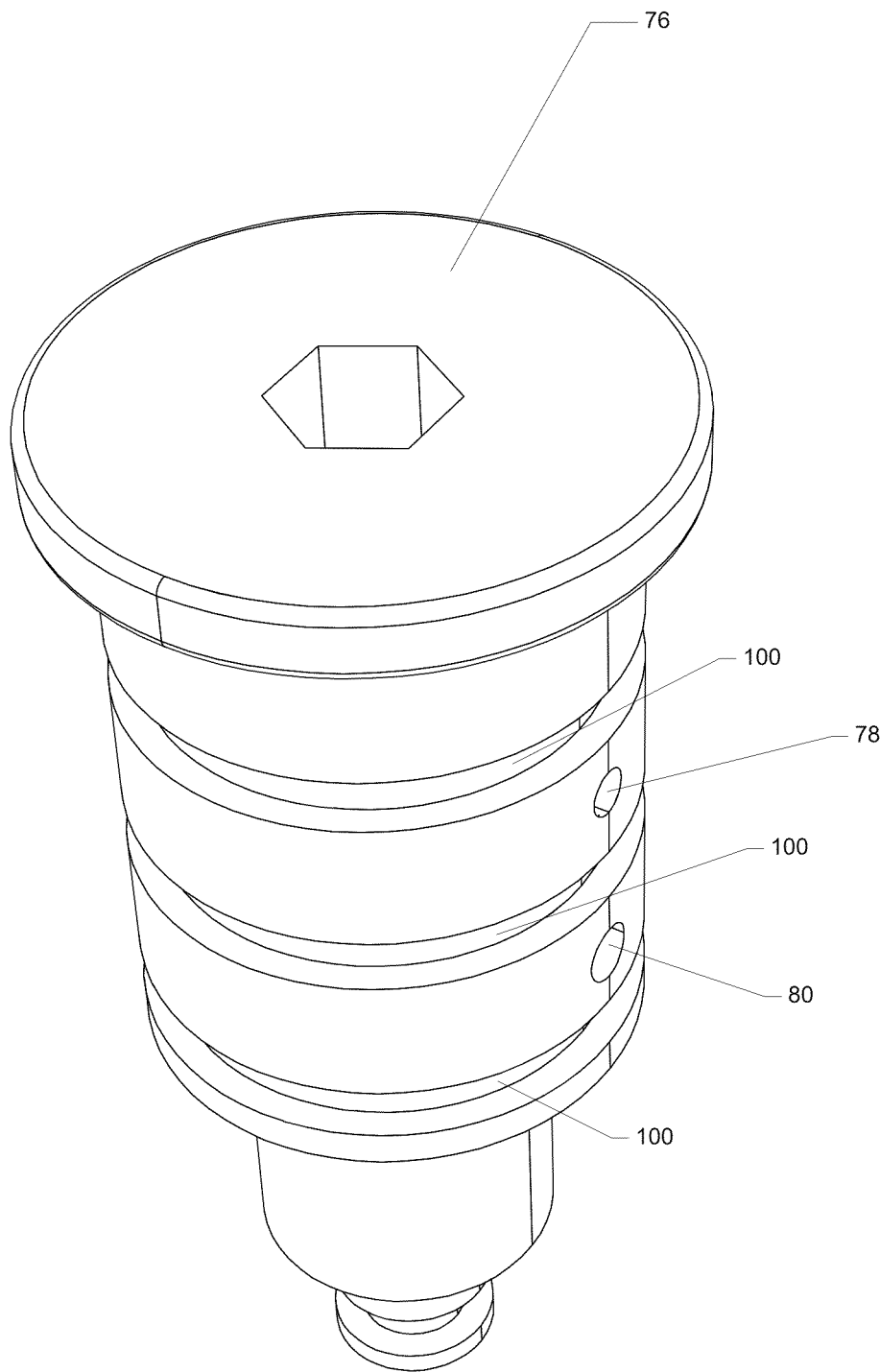
FIG. 22 a perspective view of a particular embodiment of a lug utilizing certain aspects of the present inventions.
Figure 23:
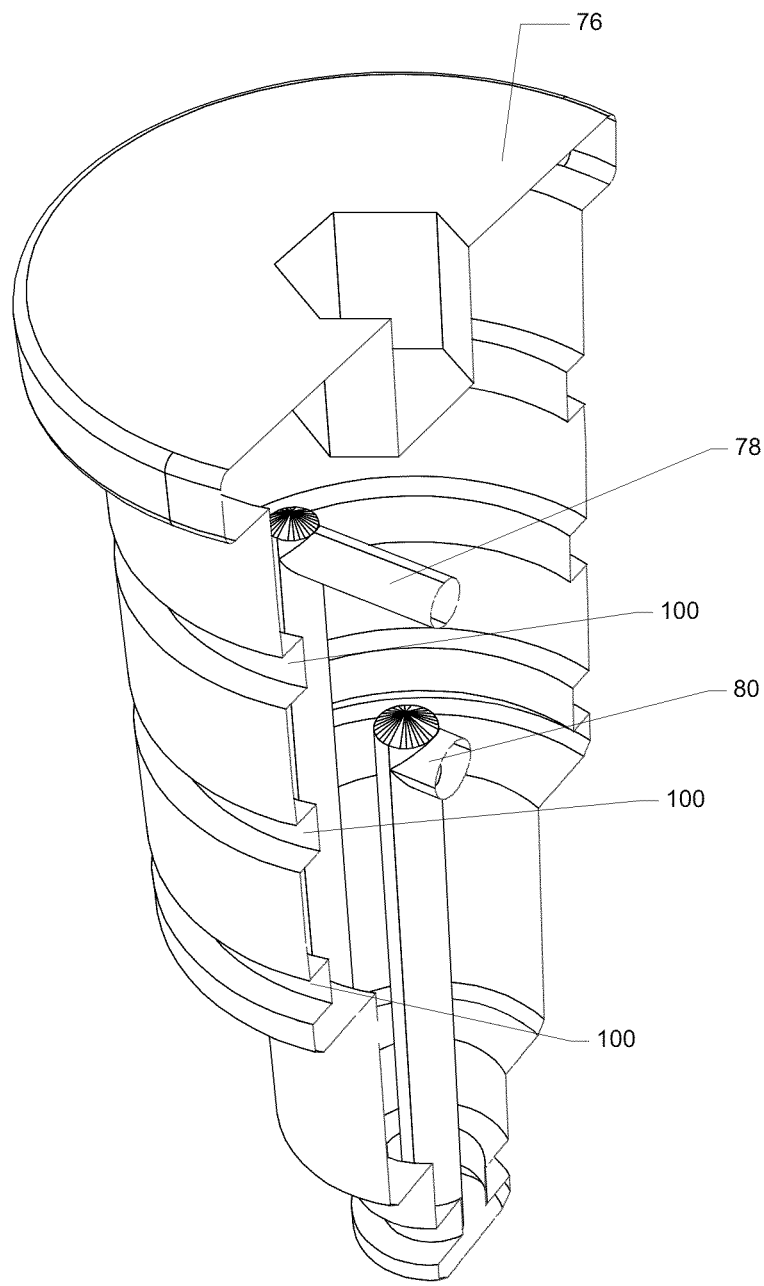
FIG. 23 illustrates a sectional view of the lug utilizing certain aspects of the present inventions.

As shown in FIGS. 20 and 21, a lug 76 may screw into the operator 56, through the solenoid mounting body 74, thereby rotatably securing the solenoid mounting body 74 to the operator 56. Referring also to FIGS. 22 and 23, the lug 76 may include a number of internal passages 78 that may be in communication with the input port 48, common port 50, and/or exhaust port 52, through the operator 56, endcap 60, and the communication ports 26a, 26b, 26c, 26d, as discussed above. In one embodiment, the lug 76 may also include an internal spool passage 80 that may be configured to communicate the input pressure, common pressure, and/or exhaust pressure to the spool 54, to manipulate the spool 54 and operate the valve 10, using the pilot valve 72.

Figure 24:
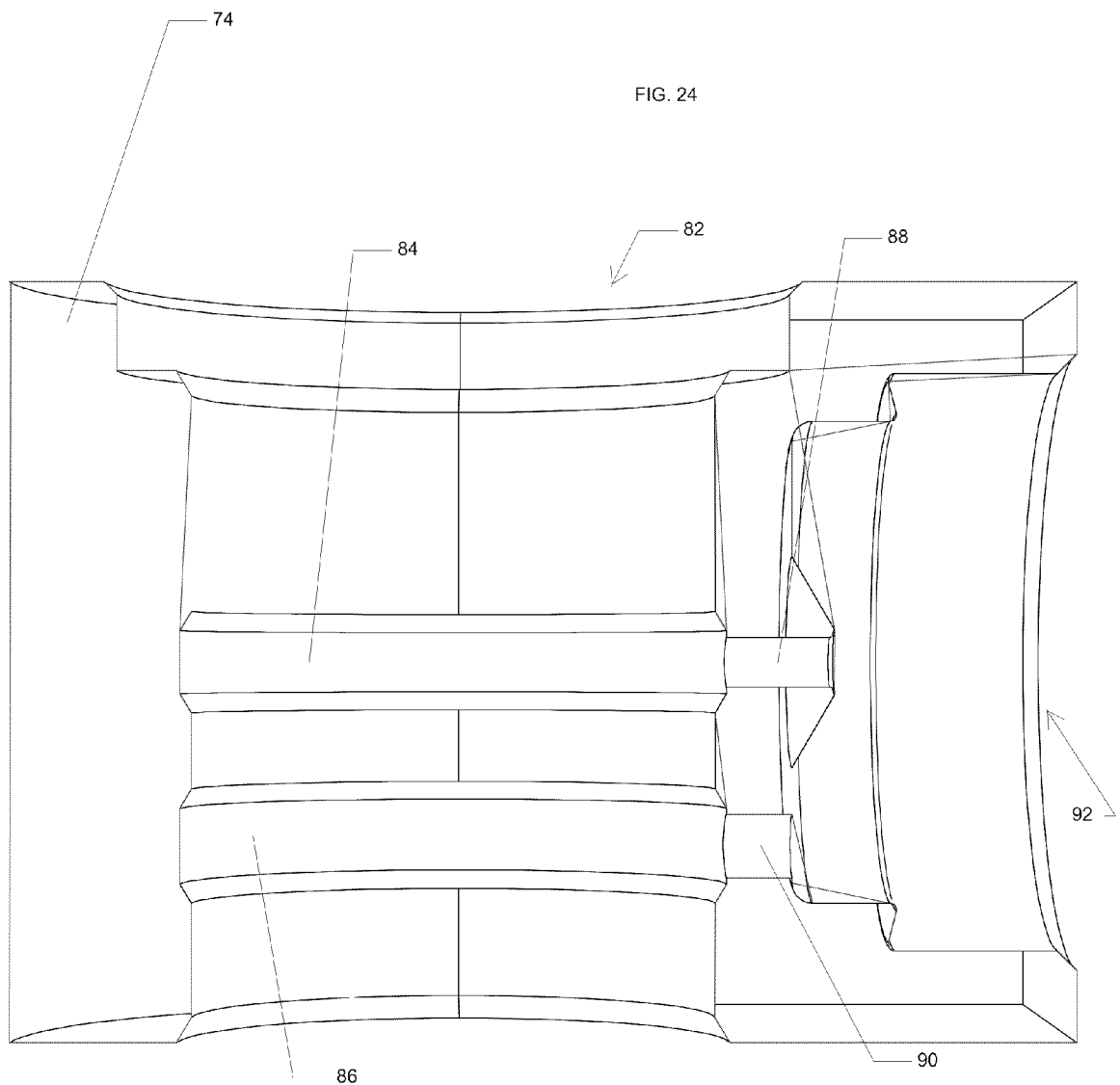
FIG. 24 illustrates a sectional view of a particular embodiment of a solenoid mounting body utilizing certain aspects of the present inventions.

Referring also to FIG. 24, when the lug 76 is mounted within a central cavity 86 of the solenoid mounting body 74, the internal passages 78, 80 align with annular grooves 84, 86 in the central cavity 82, and are thereby operable to communicate the input pressure from the input port 48 to and from the solenoid mounting body 74. Seals (not shown), such as o-ring seals, may be used to seal the passages 78, 80 and annular grooves 84,86 in the central cavity 82 from each other and the atmosphere, as well as other portions of the valve 10.

Figure 25:
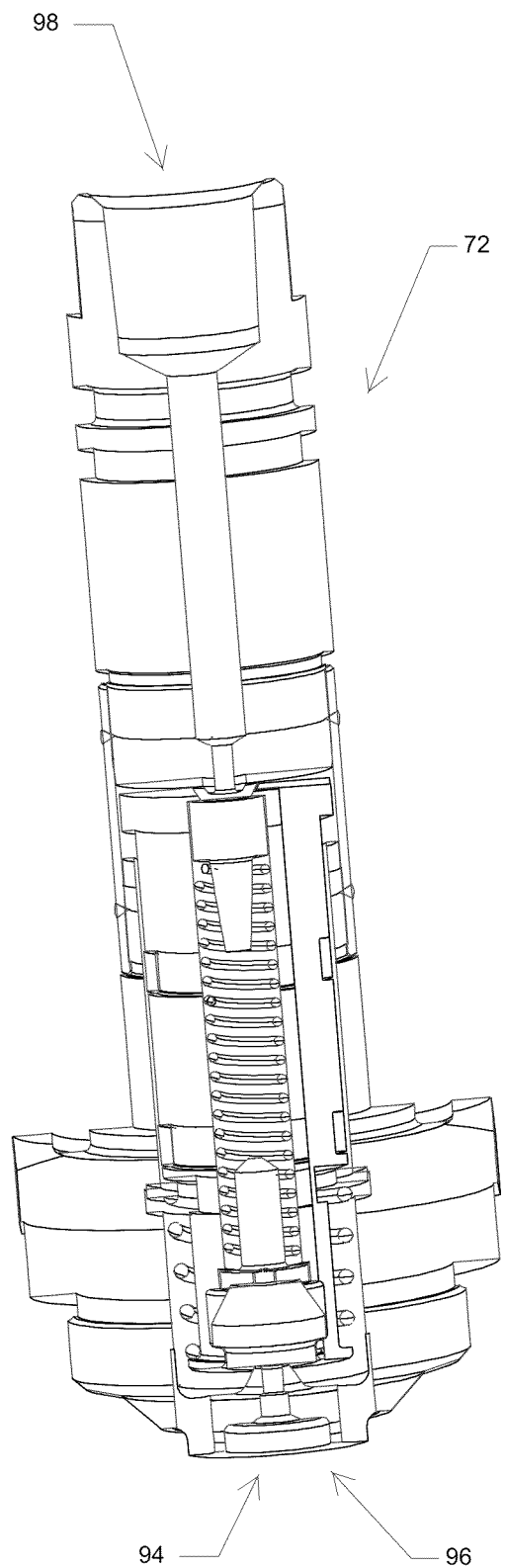
FIG. 25 illustrates a sectional view of a particular embodiment of a pilot valve utilizing certain aspects of the present inventions.
Figure 26:
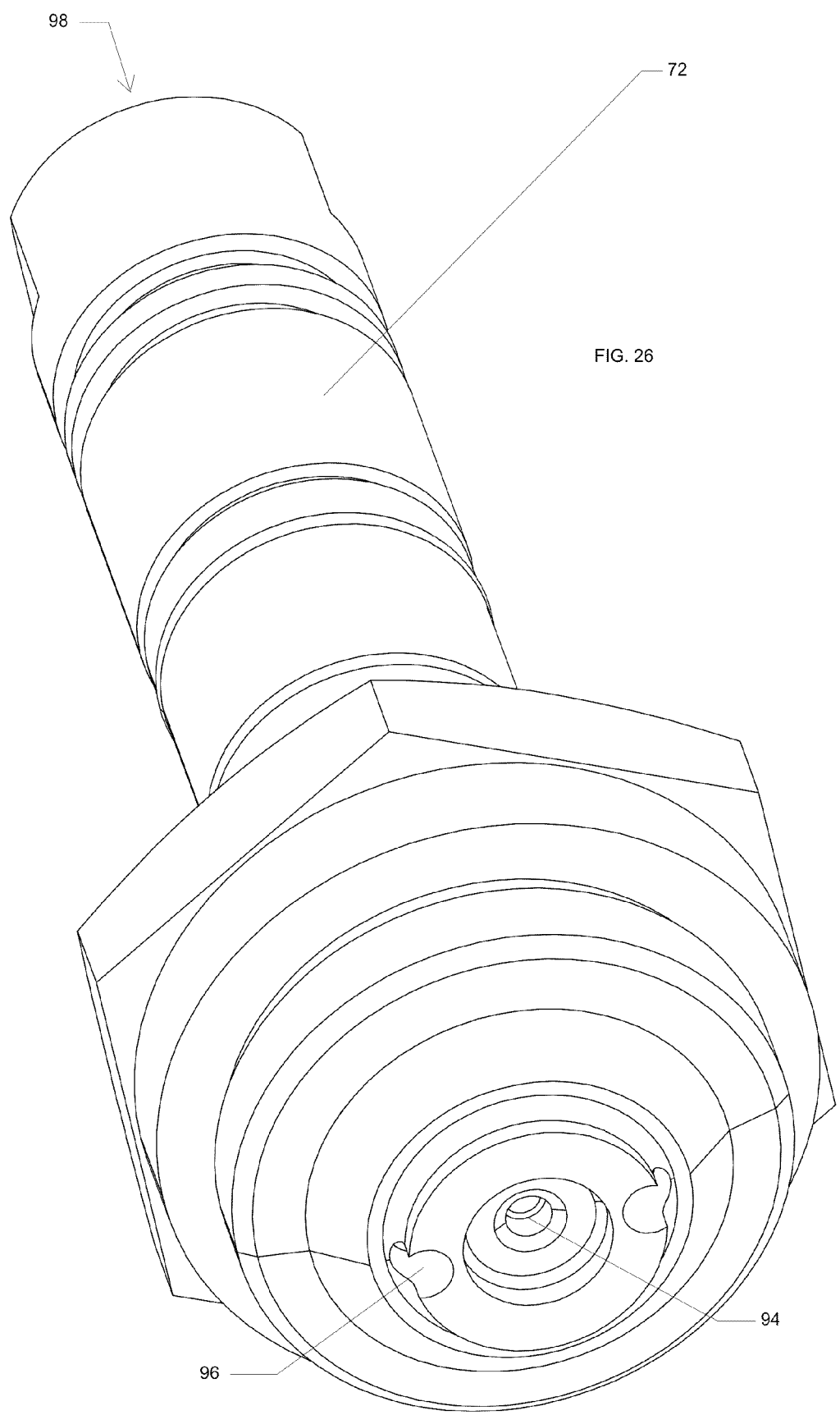
FIG. 26 illustrates a perspective view of the pilot valve utilizing certain aspects of the present inventions.
Figure 27:
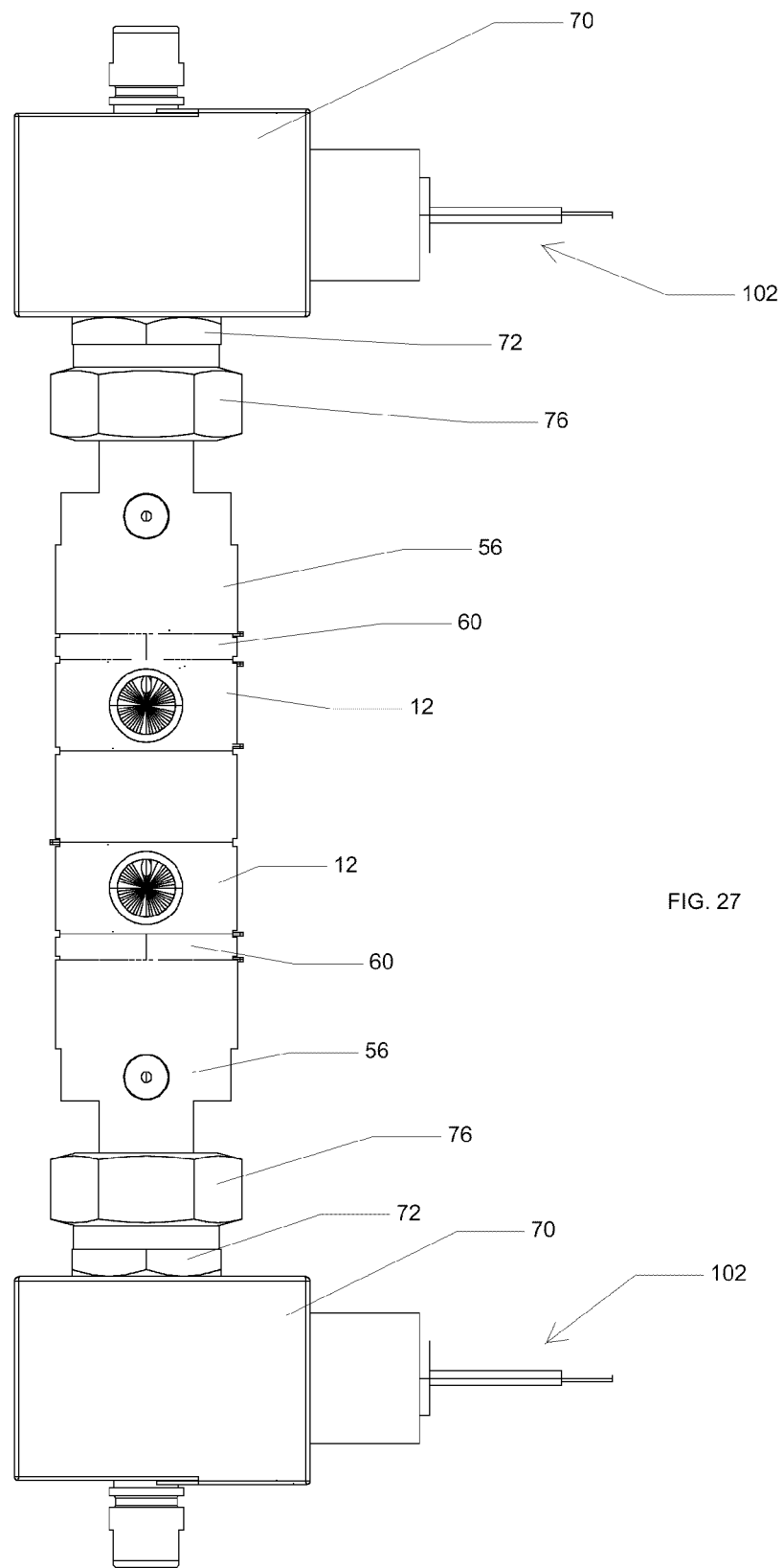
FIG. 27 illustrates an elevation view of another particular embodiment of the modular spool valve utilizing certain aspects of the present inventions.
Figure 28:
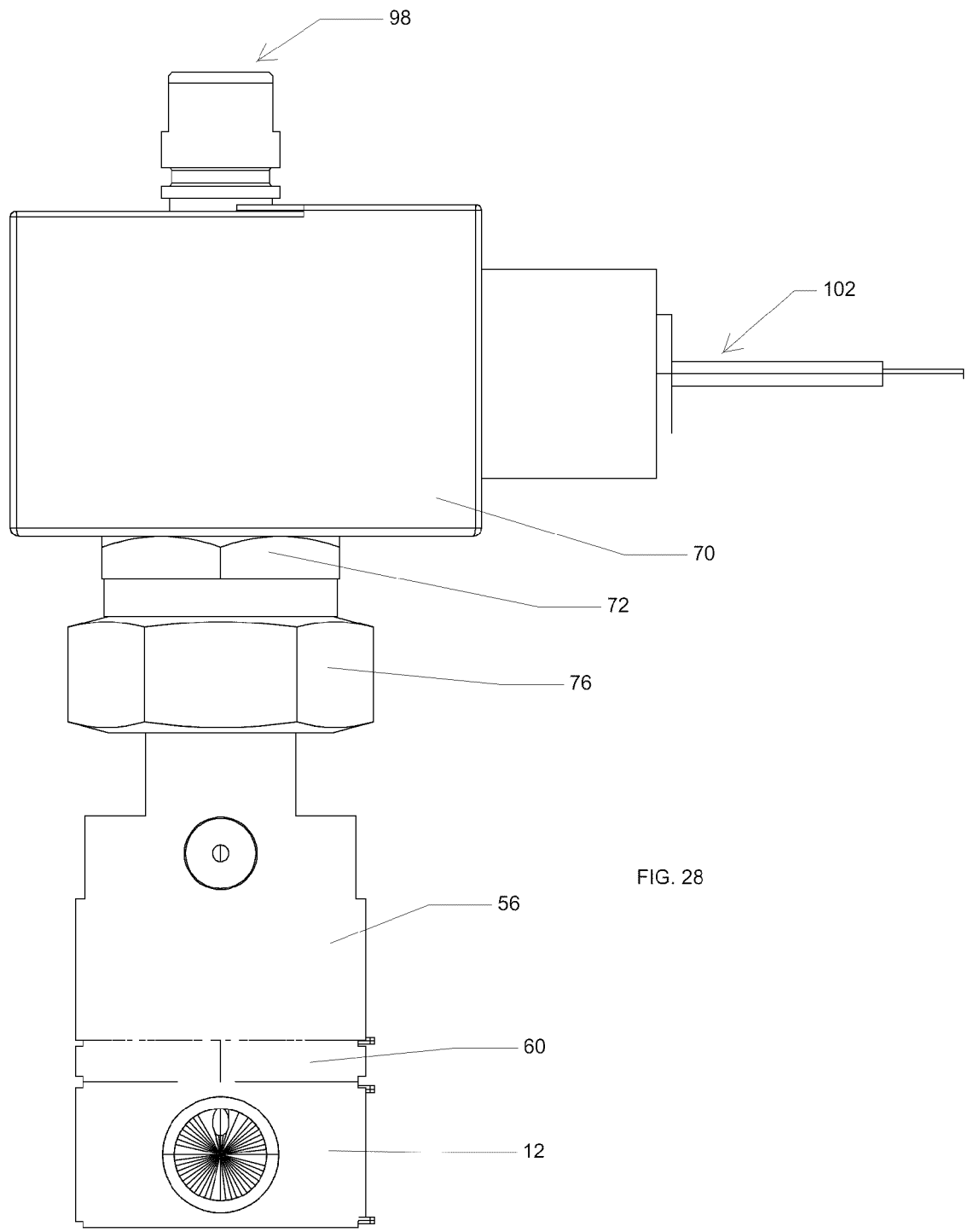
FIG. 28 illustrates an elevation view of select components of the modular spool valve utilizing certain aspects of the present inventions.
Figure 29:
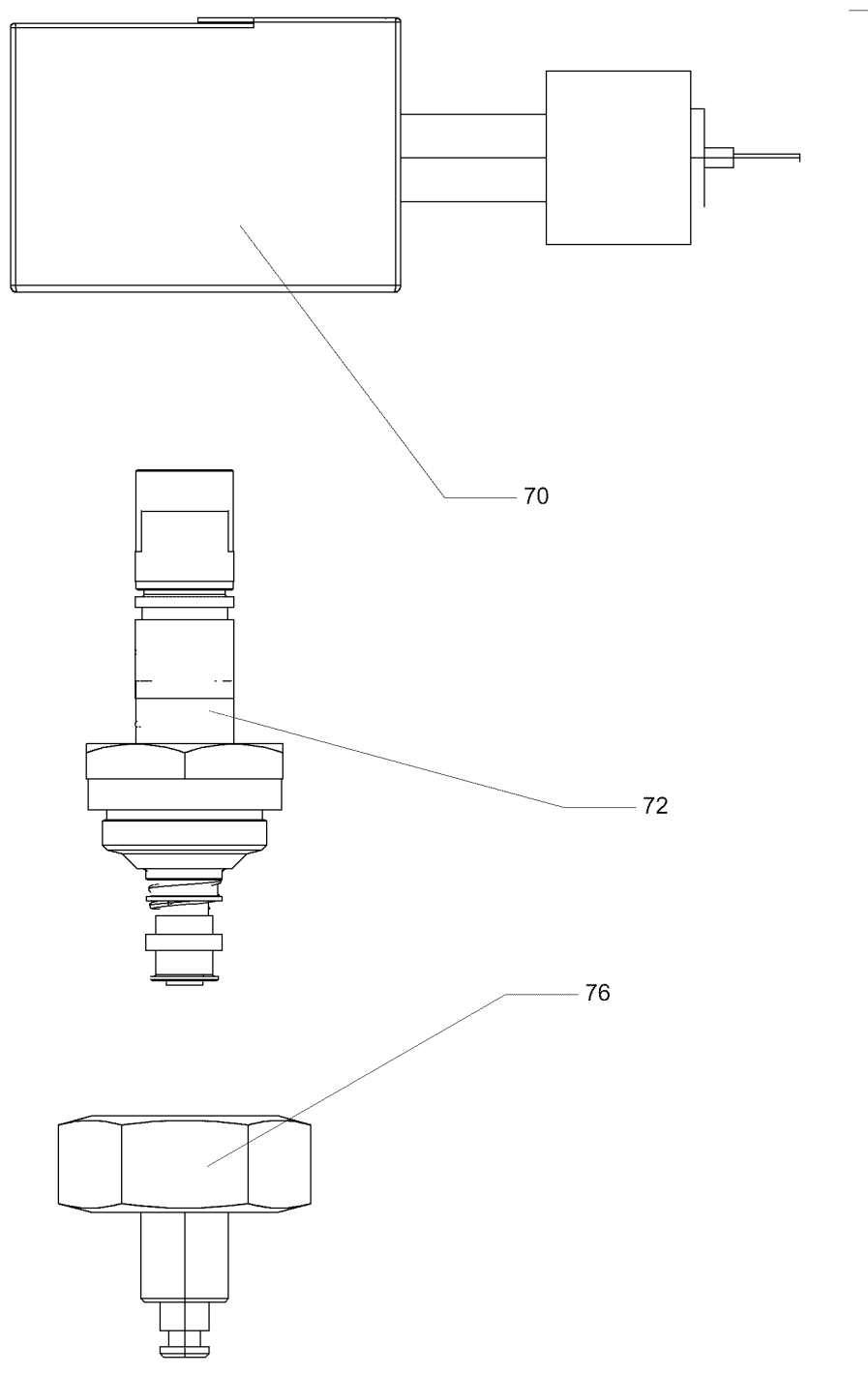
FIG. 29 illustrates an exploded view of a particular embodiment of select components of the modular spool valve utilizing certain aspects of the present inventions.

Passages 88,90 within the solenoid mounting body 74 communicate the input pressure from the internal passages 78,80 and annular grooves 84,86 in the central cavity 82 to and from a pilot opening 92, into which the pilot valve 72 is received. Referring also to FIGS. 25 and 26, the pilot valve 72 preferably includes an input 94 which receives the input pressure from the input port 48, through the passage 88 and annular groove 84 of the solenoid mounting body 74, the internal passage 78 of the lug 76 and the communication ports 26a,26b,26c,26d, as discussed above. The pilot valve 72 also preferably includes an output 96 to selectively communicate the input pressure to the operator 56, to operate the valve 10, through the passage 90 and annular groove 86 of the solenoid mounting body 74, the internal passage 80 of the lug 76 and the communication ports 26a,26b,26c,26d, as discussed above. The pilot valve 72 also preferably includes a vent 98 to vent pressure from the output 96, and thus relieve pressure from the operator 56 to operate the valve 10, when the coil 70 is operated. Thus, the pilot valve 72 may be a 3-port 2-way valve.

For example, in one embodiment, when the coil 70 is energized, the pilot valve 72 communicates input pressure from the input port 48, through the input 94 of the pilot valve 72, the passage 88 and annular groove 84 of the solenoid mounting body 74, the internal passage 78 of the lug 76, and the communication ports 26a,26b,26c,26d to the operator 56 through the output 96 of the pilot valve 72, the passage 90 and annular groove 86 of the solenoid mounting body 74, the internal passage 80 of the lug 76 and the communication ports 26a,26b,26c,26d, thereby shifting the operator 56 and operating the valve. When the coil 70 is de-energized, the pilot valve 72 blocks communication between the input 94 and the output 96, and vents the pressure from the operator 56 out of the vent 98, through the output 96 of the pilot valve 72, the passage 90 and annular groove 86 of the solenoid mounting body 74, the internal passage 80 of the lug 76 and the communication ports 26a,26b,26c,26d.

Each lug 76 may also have annular grooves 100 to accept o-ring seals, in order to seal the internal passages 78,80. Alternatively, the annular grooves 84,86, of the solenoid mounting body 74 and lug 76 may be shifted both in terms of location and function. For example, the annular grooves 84,86 of the solenoid mounting body 74 may house o-rings, while the annular grooves 100 of the lug 76 communicate the input pressure, as described above.

In any case, because the lug 76 and the central cavity 86 of the solenoid mounting body 74 are cylindrical, the solenoid mounting body 74 may rotate about the lug 76, thereby allowing the coil 70, the pilot valve 72, and/or the solenoid mounting body 74 to rotate about the lug 76 and/or a longitudinal axis of the valve 10. A wave spring (not shown) between the solenoid mounting body 74 and the lug 76 may be used to selectively apply frictional resistance between the solenoid mounting body 74 and the lug 76, thereby allowing the solenoid mounting body 74 to rotate with respect to the lug 76; but, not move too easily. Alternatively, a spring loaded ball and groove detent may be used to lock the solenoid mounting body 74 into one of several positions, such as every 30, 45, and/or 90 degrees. Alternatively, the solenoid mounting body 74 may be freely rotated about the lug 76, until the lug 76 is tightened within the operator 56 thereafter resisting further movement of the solenoid mounting body 74 until the lug 76 is loosened. Additionally, the coil 70 may rotate about the pilot valve 72.

Referring also to FIGS. 27-30, the pilot valve 72 may secure directly into the lug 76. In this embodiment, the solenoid mounting body 74 is unnecessary and the pilot opening 92 may be in the lug 76 itself. Further, rather than being mounted at approximately ninety degrees from the longitudinal axis of the valve 10, as described above, the pilot valve 72 may be inline with the longitudinal axis of the valve 10. In this case, the coil 70 may still rotate about the pilot valve 72 and thus the longitudinal axis of the valve 10.

In any case, the coil 70 may be oriented in virtually any orientation with respect to the longitudinal axis of the valve 10. This, in turn, allows electrical connections 102 of the coil 70 to be oriented in virtually any orientation with respect to the longitudinal axis of the valve 10. More specifically, like the coil 70 itself, the electrical connections 102 may be rotated about the pilot valve 72 and/or the longitudinal axis of the valve 10. For example, where the pilot valve 72 is inline with the longitudinal axis of the valve 10, the coil 70 and/or the electrical connections 102 may be rotated through 360 degrees around the longitudinal axis of the valve 10. Where the pilot valve 72 connects to the valve 10 through the solenoid mounting body 74, the solenoid mounting body 74 allows the coil 70 and/or the electrical connections 102 to be rotated through 360 degrees around the longitudinal axis of the valve 10. Furthermore, in this latter example, the pilot valve 72 may be perpendicular, or at some other angle, with respect to the longitudinal axis of the valve 10, and therefore the coil 70 and/or the electrical connections 102 may be rotated through 360 degrees about an axis that is perpendicular to, or at some other angle, the longitudinal axis of the valve 10. Thus, the solenoid coil 70 and/or the electrical connections 102 may be rotatable about the pilot valve 72 and/or the longitudinal axis of the valve 10. These advances allow for greater flexibility in installation of the valve 10.

One with ordinary skill in the art would understand that the valve 10 and/or the pilot valve 72 may be configured as a normally open, normally closed, or some other valve type. One with ordinary skill in the art would understand that the valve 10 and/or the pilot valve 72 may be configured to open or close when one of the coils 70 are energized. For example, when the coil 70 is energized, the pilot valve 72 may open or close, depending on its configuration, which in turn may open or close the valve 10, depending on its configuration.

Other and further embodiments utilizing one or more aspects of the inventions described above can be devised without departing from the spirit of Applicant's invention. For example, various process control valves can be assembled from the valve body modules 12 and gaskets 14, such as a two-way valve, as shown, a three-way valve, or a four-way valve. Additionally, while the second orientation or direction of the second module 12b is shown as being opposite, or 180 degrees from the first direction, the second direction may be only 90 degrees, 45 degrees, or some other offset from the first direction. In addition, while the third module 12c is described as sharing the direction or orientation of the first module 12a, the third module 12 may be oriented in a third direction which may be different from the first direction and/or second direction. Further, the various methods and embodiments of the present invention can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A control valve comprising:
   a plurality of interchangeable valve body modules, each module having two mating surfaces, an exterior surface between the mating surfaces, a main valve cavity communicating between the mating surfaces, a main port communicating between the exterior surface and the main valve cavity, and a plurality of separate cross valve communication ports communicating between the mating surfaces;
   at least one interchangeable gasket disposed between adjacent mating surfaces and configured to individually communicate the main valve cavity and the cross valve communication ports between adjacent valve body modules;
   wherein the gasket is further configured to selectively communicate between the main valve cavity and a selected one of the cross valve communication ports; and
   wherein the gasket is configured to selectively isolate the main valve cavity and the cross valve communication ports.

2. The valve as set forth in claim 1, wherein the valve comprises three valve body modules, at least two gaskets, a valve spool extending along the main valve cavities of the valve body modules and gaskets, and two endcaps.

3. The valve as set forth in claim 2, wherein a first one of the valve body modules is oriented in a first direction with its main port forming an input port of the valve, wherein a second one of the valve body modules is oriented in a second direction with its main port forming a common port of the valve, and wherein a third one of the valve body modules is oriented in the first direction with its main port forming an exhaust port of the valve.

4. The valve as set forth in claim 1, wherein one of the main ports of one of the valve body modules forms an input port of the valve which is communicated through each of the valve body modules by the cross valve communication ports.

5. The valve as set forth in claim 1, wherein one of the main ports of one of the valve body modules forms an exhaust port of the valve which is communicated through each of the valve body modules by the cross valve communication ports.

6. The valve as set forth in claim 1, wherein one of the main ports of one of the valve body modules forms a common port of the valve which is communicated through each of the valve body modules by the cross valve communication ports.

7. The valve as set forth in claim 1, wherein the valve body modules are identical.

8. The valve as set forth in claim 1, wherein each valve body module further includes a passage communicating between the main valve cavity and one of the two mating surfaces.

9. The valve as set forth in claim 8, wherein the gasket is configured to individually communicate each cross valve communication port between adjacent valve body modules and selectively communicate between the passage and the selected one of the cross valve communication ports, thereby selectively communicating between the main valve cavity and the selected one of the cross valve communication ports through the passage by selective orientation of the gasket.

10. A control valve comprising:
    a three identical valve body modules, each module having two mating surfaces, an exterior surface between the mating surfaces, a main valve cavity communicating between the mating surfaces, a passage communicating between the main valve cavity and one of the two mating surfaces, a main port communicating between the exterior surface and the main valve cavity, and a plurality of separate cross valve communication ports communicating between the mating surfaces;
    at least two identical gaskets, each gasket disposed between adjacent mating surfaces and configured to individually communicate the main valve cavity and the cross valve communication ports between adjacent valve body modules;
    wherein the gaskets are further configured to selectively communicate between the passage and a selected one of the cross valve communication ports;
    wherein the gasket is configured to communicate the passage with a first one of the cross valve communication ports in a first orientation;
    wherein the gasket is configured to communicate the passage with a second one of the cross valve communication ports in a second orientation: and
    wherein the gasket is configured to isolate the passage from the cross valve communication ports in a third orientation.

11. The valve as set forth in claim 10, wherein the gasket is configured to isolate the passage from the cross valve communication ports in a fourth orientation.

12. A control valve comprising:
    a plurality of interchangeable valve body modules, each module having two mating surfaces, an exterior surface between the mating surfaces, a main valve cavity communicating between the mating surfaces, a main port communicating between the exterior surface and the main valve cavity, and a plurality of separate cross valve communication ports communicating between the mating surfaces;
    at least one interchangeable gasket disposed between adjacent mating surfaces and configured to individually communicate the main valve cavity and the cross valve communication ports between adjacent valve body modules; and
    wherein the gasket is further configured to selectively communicate between the main valve cavity and a selected one of the cross valve communication ports;
    wherein each valve body module further includes a passage communicating between the main valve cavity and one of the two mating surfaces, and
    wherein the gasket is configured to individually communicate each cross valve communication port between adjacent valve body modules and selectively communicate between the passage and the selected one of the cross valve communication ports, thereby selectively communicating between the main valve cavity and the selected one of the cross valve communication ports through the passage by selective orientation of the gasket.

13. The valve as set forth in claim 12, wherein the gasket is configured to selectively communicate between the main valve cavity and the selected one of the cross valve communication ports by selective orientation of the gasket.

14. The valve as set forth in claim 13, wherein the gasket is configured to communicate between the main valve cavity and a first one of the cross valve communication ports in a first orientation.

15. The valve as set forth in claim 14, wherein the gasket is configured to communicate between the main valve cavity and a second one of the cross valve communication ports in a second orientation.

16. The valve as set forth in claim 15, wherein the gasket is configured to isolate the main valve cavity from the cross valve communication ports in a third orientation.

17. The valve as set forth in claim 16, wherein the gasket is configured to isolate the main valve cavity from the cross valve communication ports in a fourth orientation.

* * * * *